United States Patent
Shioguchi

(10) Patent No.: US 11,967,007 B2
(45) Date of Patent: Apr. 23, 2024

(54) VEHICLE SURROUNDINGS INFORMATION DISPLAYING SYSTEM AND VEHICLE SURROUNDINGS INFORMATION DISPLAYING METHOD

(71) Applicant: Faurecia Clarion Electronics Co., Ltd., Saitama (JP)

(72) Inventor: Takuma Shioguchi, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 78 days.

(21) Appl. No.: 17/835,122

(22) Filed: Jun. 8, 2022

(65) Prior Publication Data

US 2022/0398788 A1 Dec. 15, 2022

(30) Foreign Application Priority Data

Jun. 15, 2021 (JP) .................................. 2021-099180

(51) Int. Cl.
*G06T 11/20* (2006.01)
*G01S 17/89* (2020.01)

(52) U.S. Cl.
CPC ............ *G06T 11/203* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 10,488,215 B1 * | 11/2019 | Yu ........................ | G01C 21/365 |
| 11,370,424 B1 * | 6/2022 | Cohen .................... | G06V 10/25 |
| 2012/0025964 A1 * | 2/2012 | Beggs .................... | G08G 1/166 |
| | | | 340/435 |
| 2013/0162665 A1 * | 6/2013 | Lynch ................... | G09B 29/106 |
| | | | 345/589 |
| 2016/0375768 A1 * | 12/2016 | Konet .................... | G08G 1/166 |
| | | | 348/148 |
| 2018/0009378 A1 * | 1/2018 | Myers .................... | B60Q 9/008 |
| 2019/0331497 A1 | 10/2019 | Vora et al. | |
| 2020/0132477 A1 * | 4/2020 | Averilla .................. | G01S 19/42 |
| 2021/0039715 A1 * | 2/2021 | Ferrer .................... | H04W 4/46 |
| 2021/0297633 A1 * | 9/2021 | Motoyama ............... | G06T 7/73 |
| 2022/0058844 A1 * | 2/2022 | Chen ...................... | G06F 3/147 |

(Continued)

FOREIGN PATENT DOCUMENTS

JP 2012-134586 A 7/2012

*Primary Examiner* — Ryan M Gray

(74) *Attorney, Agent, or Firm* — IP Business Solutions, LLC

(57) ABSTRACT

A vehicle surroundings information displaying system comprising: a surroundings information image generating unit for generating a surroundings information image, showing the surroundings information for the vehicle, based on point group data that indicates distances from the vehicle, acquired by a distance sensor; a map image acquiring unit for acquiring a map image of the surroundings of the vehicle; an overhead image acquiring unit for acquiring an overhead image of the surroundings of the vehicle; and a display image generating unit for generating a display image, to be displayed on the display panel, by combining the map image, a vehicle mark that indicates the location of the vehicle, the overhead image that is placed surrounding the vehicle mark, and the surroundings information image that is placed surrounding the overhead image.

6 Claims, 13 Drawing Sheets

(56) References Cited

U.S. PATENT DOCUMENTS

2022/0267992 A1\* 8/2022 Clare .................... E02F 9/24
2022/0404163 A1\* 12/2022 Shioguchi ............. G06F 3/0488
2022/0415059 A1\* 12/2022 Smolyanskiy .... B60W 60/0016

\* cited by examiner

VEHICLE SURROUNDINGS INFORMATION DISPLAYING SYSTEM AND VEHICLE SURROUNDINGS INFORMATION DISPLAYING METHOD

CROSS-REFERENCE TO RELATED APPLICATIONS

The present application claims priority under 35 U.S.C. § 119 to Japanese Patent Application No. 2021-099180 filed on Jun. 15, 2021. The content of the application is incorporated herein by reference in its entirety.

BACKGROUND OF THE INVENTION

Field of the Invention

The present invention relates to a vehicle surroundings information displaying system and vehicle surroundings information displaying method.

Description of the Related Art

Conventionally, a technology has been known for displaying an image that shows information regarding the surroundings of a vehicle.

For example, Patent Document 1 describes a technology for reducing the effects of smearing, if smearing has occurred, through the effect of a high-brightness imaging subject when displaying the image of the periphery of the vehicle.

PRIOR ART REFERENCES

Patent Documents

[Patent Document 1] Japanese Unexamined Patent Application Publication 2012-134586

SUMMARY OF THE INVENTION

However, the technology described in Patent Document 1 does no more than display an overhead image (a "surround view") based on images captured by cameras, so does no more than display surroundings information for a short distance from the vehicle.

The object of the present invention is to provide a vehicle surroundings information displaying system and vehicle surroundings information displaying method able to display surroundings information in a broader range than an overhead image.

In order to achieve the object set forth above, the vehicle surroundings information displaying system according to the present invention comprises: a surroundings information image generating unit for generating surroundings information, showing surroundings information for a vehicle, based on point group data that indicate distances from a vehicle, acquired by a sensor; a map image acquiring unit for acquiring a map image of the surroundings of the vehicle; a display image generating unit for generating a display image, to be displayed on the display panel, through combining the map image, a vehicle mark that indicates the location of the vehicle, an overhead image placed surrounding the vehicle mark, and a surroundings information image placed surrounding the overhead image.

In order to achieve the object set forth above, the vehicle surroundings information displaying method according to the present invention includes: a surroundings information image generating step for generating surroundings information, showing surroundings information for a vehicle, based on point group data that indicate distances from a vehicle, acquired by a sensor; a map image acquiring step for acquiring a map image of the surroundings of the vehicle; an overhead image acquiring step for acquiring an overhead image of the surroundings of the vehicle; and a display image generating step for generating a display image, to be displayed on the display panel, through combining the map image, a vehicle mark that indicates the location of the vehicle, an overhead image placed surrounding the vehicle mark, and a surroundings information image placed surrounding the overhead image.

Effects of the Invention

The vehicle surroundings information displaying system and vehicle surroundings information displaying method according to the present invention combine a map image, a vehicle mark that shows the position of the vehicle, an overhead image that is placed surrounding the vehicle mark, and a surroundings information image that is placed surrounding the overhead image, to generate a display image to be displayed on a display. Consequently, surroundings information can be displayed in a broader range than with an overhead image.

DETAILED DESCRIPTION OF THE INVENTION

In the below an embodiment according to the present invention will be explained in reference to the drawings.

Figure 1:
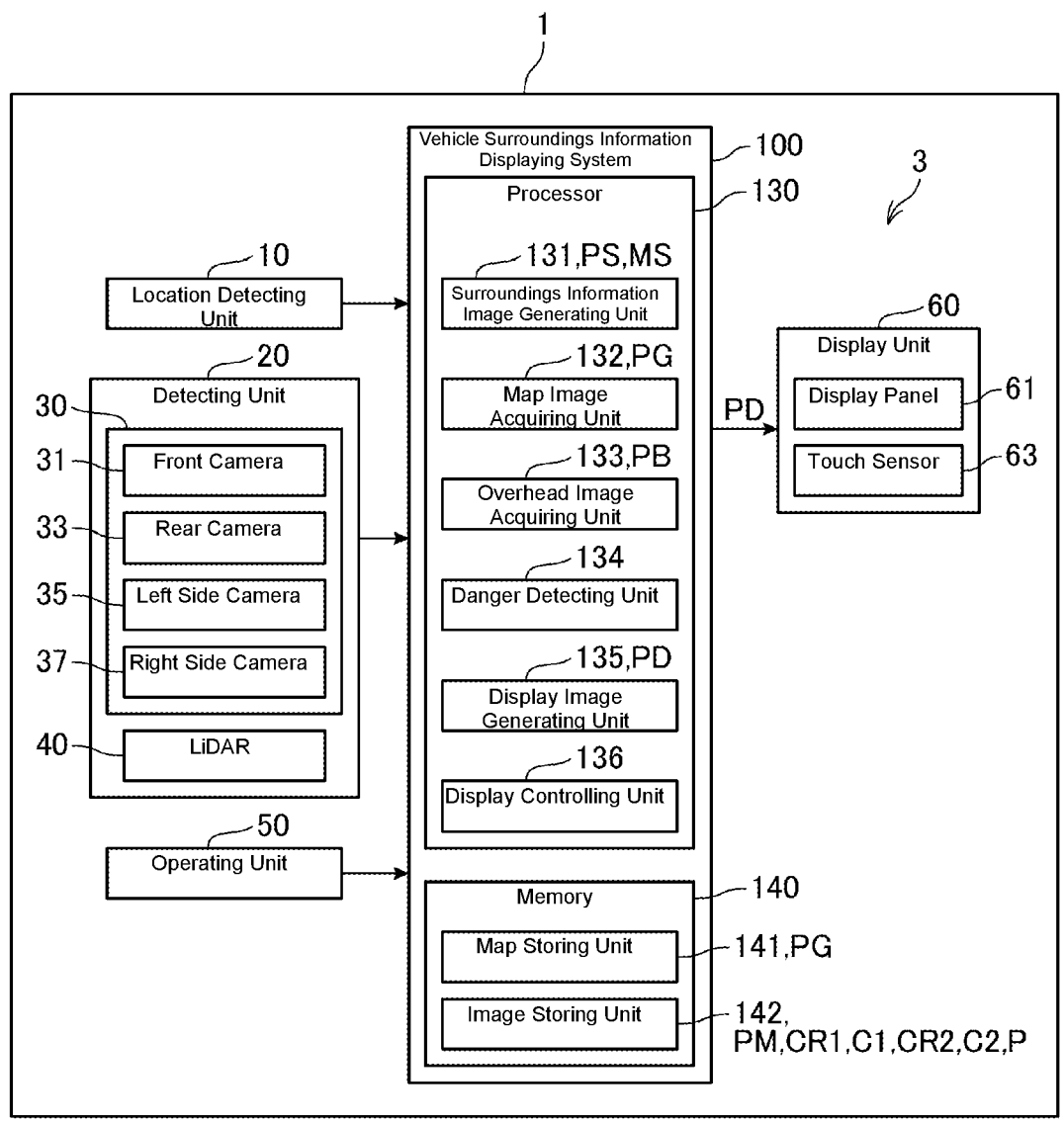
FIG. 1 is a diagram showing an example structure for an onboard system that includes the vehicle surroundings information displaying system.

FIG. 1 is a diagram showing an example structure for an onboard system 3 that includes the vehicle surroundings information displaying system 100.

The onboard system 3 is installed in a vehicle 1.

The onboard system 3 comprises a location detecting unit 10, a detecting unit 20, an operating unit 50, a display unit 60, and a vehicle surroundings information displaying system 100.

The location detecting unit 10 detects the location of the vehicle 1. The location detecting unit 10 comprises a GNSS receiver for receiving a GNSS (Global Navigation Satellite System) signal and a processor for calculating the location of the vehicle 1 based on the GNSS signal received by the GNSS receiver. The GNSS receiver and processor are omitted from the drawings. The location detecting unit 10 outputs, to the vehicle surroundings information displaying system 100, location information indicating the location of the vehicle 1.

The detecting unit 20 captured images of the surroundings of the vehicle 1 and detects point group data that indicate the distance from the vehicle 1 to moving bodies MS that exist in a range up to a prescribed distance from the vehicle 1. The moving bodies MS include other vehicles C, bicycles, and pedestrians. The prescribed distance is, for example, 20 m.

The detecting unit 20 comprises an imaging unit 30 and a distance sensor 40.

The imaging unit 30 captures images of the surroundings of the vehicle 1. The imaging unit 30 is equipped with a front camera 31 for imaging forward of the vehicle 1, a rear camera 33 for imaging rearward of the vehicle 1, a left side camera 35 for imaging toward the left side of the vehicle 1, and a right side camera 37 for imaging toward the right side of the vehicle 1.

These cameras are each equipped with image sensors such as, for example, CCDs (Charge-Coupled Devices) or CMOS (Complementary Metal-Oxide-Semiconductor) sensors, or the like, and with data processing circuits for generating captured images from the image sensors.

In the imaging unit 30, the viewing angles of each of the cameras facing in the four dimensions are adjusted so as to enable imaging in a range of 360°, centered on the vehicle 1, through the cameras that are facing in the four directions. Each individual camera of the front camera 31, the rear camera 33, the left side camera 35, and the right side camera 35 generates a captured image by capturing an imaging range with a prescribed frame rate. The front camera 31, the rear camera 33, the left side camera 35, and the right side camera 37 each carries out imaging of the respective imaging range at a prescribed frame rate, to generate captured images. The imaging unit 30 outputs the generated captured images to the vehicle surroundings information displaying system 100. The vehicle surroundings information displaying system 100 stores the inputted captured images into a memory 140.

Note that each of the individual cameras (the front camera 31, the rear camera 33, the left side camera 35, and the right side camera 37) may be structured from a single camera, or may be structured from a plurality of cameras.

The distance sensor 40 detects point group data indicating a distance to a moving body MS that exists in a range up to a prescribed distance from the vehicle 1. The distance sensor 40 comprises LiDARs (Light Detection and Ranging) at a plurality of locations of toward the front, the rear, the left side, and the right side, for example, of the vehicle 1, and uses electromagnetic signals to acquire point group data. Each individual point datum that structures the point group data indicates the distance to a moving body MS that exists in a range up to a prescribed distance from the vehicle 1.

While in the present embodiment the explanation will be for a case wherein a LiDAR is used for the distance sensor 40, there is no limitation thereto. The distance sensor 40 may instead be, for example, a radar or a sonar sensor.

Moreover, while in the present embodiment the explanation will be for a case wherein LiDARs are provided in a plurality of locations such as toward the front, the rear, the left, and the right of the vehicle 1, there is no limitation thereto. The LiDAR may be disposed on the roof of the vehicle 1 so as to acquire point group data for the entire periphery (that is, forward, rearward, to the left, and to the right) thereof.

The distance sensor 40 corresponds to an example of a "sensor."

The operating unit 50 receives an operation from a user that is an occupant of the vehicle 1. The user is, for example, the driver. The operating unit 50 outputs, to the vehicle surroundings information displaying system 100, an operating signal in accordance with the operation that has been received. Operations received by the operating unit 50 include, for example, an operation for instructing the vehicle surroundings information displaying process to start, an operation for ending the vehicle surroundings information displaying process, and the like.

The operating unit 50 comprises a vehicle surroundings information display ON switch, not shown, and a vehicle surroundings information display OFF switch, not shown, and when the vehicle surroundings information display ON switch is pressed, the vehicle surroundings information displaying system 100 receives an operation instructing commencement of the vehicle surroundings information displaying process.

Moreover, if, during the execution of the vehicle surroundings information displaying process, the vehicle surroundings information display OFF switch is pressed, the vehicle surroundings information displaying system 100 receives an operation for ending the vehicle surroundings information displaying process.

Note that the "vehicle surroundings information displaying process" is a process by which the vehicle surroundings information displaying system 100 generates a display image PD by combining a map image PG, a vehicle mark PM, an overhead image PB, and a surroundings information image PS, and displays the generated display image PD on a display panel 61.

For the "vehicle surroundings information displaying process," the functional structure of the vehicle surroundings information displaying system 100 will be explained in reference to FIG. 1, and further explained in reference to FIG. 2 through FIG. 13.

In addition, the map image PG, the vehicle mark PM, the overhead image PB, the surroundings information image PS, and the display image PD will be explained in reference to FIG. 2 through FIG. 10.

The display unit 60 comprises a display panel 61 and a touch sensor 63.

A liquid crystal display, an organic EL display, or the like, is used in the display panel 61. The display unit 60 displays an image such as the display image PD, or the like, on the display panel 61 based on display data inputted from the vehicle surroundings information displaying system 100.

The display panel 61 corresponds to an example of a "display."

The display image PD will be explained in reference to FIG. 2 through FIG. 10.

The touch sensor 63 uses a resistance film-type sensor or an electrostatic capacitance-type sensor. The display unit 60 detects, through the touch sensor 63, a touch operation by the finger of the user on the display panel 61, to generate a location signal indicating the operating location of the touch operation that has been detected. The display unit 60 outputs the generated location signal to the vehicle surroundings information displaying system 100.

The vehicle surroundings information displaying system 100 is a computer comprising a processor 130, such as a CPU (Central Processing Unit), an MPU (Micro-Processing Unit), or the like, and a memory 140, such as a ROM (Read-Only Memory), a RAM (Random Access Memory), or the like. The vehicle surroundings information displaying system 100 comprises, in addition to these devices, an interface circuit for connecting with a storage system such as an HDD (Hard Disk Drive), an SSD (Solid State Drive), or the like, sensors, and/or peripheral devices, and so forth, and an onboard network communication circuit for communicating with other onboard systems through the onboard network, and the like. In the vehicle surroundings information displaying system 100, various types of functional structures are achieved through execution, by a processor 130, of a control program stored in the memory 140 or a storage system.

The vehicle surroundings information displaying system 100 comprises a surroundings information image generating unit 131, a map image acquiring unit 132, an overhead image acquiring unit 133, a danger detecting unit 134, a display image generating unit 135, a display controlling unit 136, a map storing unit 141, and an image storing unit 142.

Specifically, through the processor 130 executing a control program that is stored in the memory 140 or the storage system, the processor 130 functions as the surroundings information image generating unit 131, the map image acquiring unit 132, the overhead image acquiring unit 133, the danger detecting unit 134, the display image generating unit 135, and the display controlling unit 136. Additionally, by executing the control program that is stored in the memory 140 or the storage system, the processor 130 causes the memory 140 to function as the map storing unit 141 and the image storing unit 142.

The map storing unit 141 stores the map image PG. The map image PG is read out from the map image acquiring unit 132.

The image storing unit 142 stores images such as the vehicle mark PM, a first vehicle image CR1, a first vehicle mark CM1, a second vehicle image CR2, a second vehicle mark CM2, a pedestrian mark P, and the like.

The vehicle mark PM indicates a vehicle 1. The vehicle mark PM is placed at the location of the vehicle 1 in the map image PG by the display image generating unit 135. That is, the vehicle mark PM shows the location of the vehicle 1 in the map image PG.

The first vehicle image CR1 is an image of a first vehicle C1 detected by the distance sensor 40. The first vehicle image CR1 is placed at the location of the first vehicle C1 in the map image PG by the display image generating unit 135. The first vehicle C1 is, for example, a passenger vehicle that has four wheels.

The first vehicle mark CM1 indicates a first vehicle C1 that is detected by the distance sensor 40. The first vehicle mark CM1 is placed on the road in the direction ahead of the first vehicle C1 in the map image PG by the display image generating unit 135. The first vehicle mark CM1 is a mark of, for example, a pentagonal shape.

The second vehicle image CR2 is an image of a second vehicle C2 that is detected by the distance sensor 40. The second vehicle image CR2 is placed at the location of the second vehicle C2 in the map image PG by the display image generating unit 135. The second vehicle C2 is, for example, a motorcycle.

The second vehicle mark CM2 indicates a second vehicle C2 that is detected by the distance sensor 40. The second vehicle mark CM2 is placed on the road in the direction of travel of the second vehicle C2 in the map image PG by the display image generating unit 135. The second vehicle mark CM2 is a mark of, for example, a pentagonal shape.

The pedestrian mark P indicates a pedestrian detected by the distance sensor 40. The pedestrian mark P is placed at the location of a pedestrian in the map image PG by the display image generating unit 135.

The pedestrian mark P is, for example, a circle-shaped mark.

The first vehicle mark CM1 and second vehicle mark CM2 will be explained further in reference to FIG. 3 and FIG. 4.

The first vehicle image CR1 and second vehicle image CR2 will be explained further in reference to FIG. 5.

Note that in the explanation below, if there is no distinction drawn between the first vehicle C1 and the second vehicle C2, the explanation may be as "vehicle C."

The pedestrian mark P will be explained further in reference to FIG. 8.

The surroundings information image generating unit 131 acquires point group data from the distance sensor 40, to generate a surroundings information image PS, showing surroundings information for the vehicle 1, based on the point group data. Each individual point datum that structures the point group data indicates the distance to a moving body MS that exists in a range up to a prescribed distance from the vehicle 1. The prescribed distance is, for example, 20 m. The surroundings information image PS includes the first vehicle image CR1, the first vehicle mark CM1, the second vehicle image CR2, the second vehicle mark CM2, and the pedestrian mark P.

The first vehicle image CR1 is placed at the location of the first vehicle C1 on the map image PG by the display image generating unit 135 if the first vehicle C1 is included in a region that is shown in the map image PG that is displayed on the display panel 6.

The second vehicle image CR2 is placed at the location of the second vehicle C2 on the map image PG by the display image generating unit 135 if the second vehicle C2 is included in a region that is shown in the map image PG that is displayed on the display panel 6.

If the first vehicle C1 is not included in a region that is shown in the map image PG that is displayed on the display panel 6 and a danger of contact with the vehicle 1 is detected by the danger detecting unit 134, the first vehicle mark CM1 is placed on the road in the direction ahead of the first vehicle C1 on the map image PG by the display image generating unit 135.

If the second vehicle C2 is not included in a region that is shown in the map image PG that is displayed on the display panel 6 and a danger of contact with the second vehicle C2 is detected by the danger detecting unit 134, the second vehicle mark CM2 is placed on the road in the direction ahead of the second vehicle C2 on the map image PG by the display image generating unit 135.

If a pedestrian that is detected by the distance sensor 40 is included in a region that is shown in the map image PG that is displayed on the display panel 6, the pedestrian mark P is placed at the location of the pedestrian on the map image PG.

The map image acquiring unit 132 acquires, from the location detecting unit 10, location information that indicates the location of the vehicle 1, and reads out, from the map storing unit 141, a map image PG that corresponds to the acquired location information, to acquire a map image PG for the surroundings of the vehicle 1.

While in the present embodiment, the explanation will be for a case wherein the map image acquiring unit 132 acquires a map image PG for the surroundings of the vehicle 1 through reading out, from the map storing unit 141, a map image PG corresponding to location information, there is no limitation thereto. The map image PG for the surroundings of the vehicle 1 may instead be acquired through the vehicle surroundings information displaying system 100 being connected so as to enable communication with a server system and the map image acquiring unit 132 receiving, from the server system, a map image PG corresponding to the location information. In this case, there is no need for the map storing unit 141 to store the map image PG, making it possible to simplify the structure of the vehicle surroundings information displaying system 100.

The overhead image acquiring unit 133 acquires an overhead image PB of the surroundings of the vehicle 1 through generating the overhead image PB of the surroundings of the vehicle 1 through combining together each of the captured images captured by the front camera 31, the rear camera 33, the left side camera 35, and the right side camera 37.

The danger detecting unit 134 detects the danger of contact between the moving body MS and the vehicle 1 based on point group data from the distance sensor 40.

For example, the danger detecting unit 134 detects the location of the moving body MS for which there is danger of contact with the vehicle 1. The danger detecting unit 134 detects, for example, an attribute of the moving body MS for which there is a danger of contact with the vehicle 1. The attribute of the moving body MS indicates, for example, whether the moving body MS is a vehicle C or a pedestrian. Moreover, the danger detecting unit 134 detects the direction, in reference to the vehicle 1, for example, where there is a danger that the moving body MS will contact the vehicle 1. Additionally, the danger detecting unit 134 detects the magnitude of the danger of contact, for example, between the moving body MS and the vehicle 1.

The moving body MS may be another vehicle C, a bicycle, or a pedestrian.

The display image generating unit 135 combines the map image PG, the vehicle mark PM that indicates the location of the vehicle 1, the overhead image PB that is placed surrounding the vehicle mark PM, and the surroundings information image PS that is placed surrounding the overhead image PB, to generate the display image PD that is to be displayed on the display panel 61.

The surroundings information image PS includes the first vehicle image CR1, the first vehicle mark CM1, the second vehicle image CR2, the second vehicle mark CM2, and the pedestrian mark P.

In the display panel 61, the region wherein the overhead image PB is displayed is a circular first region AR1 that is centered on the vehicle mark PM.

The first region AR1 corresponds to an example of a "circular region."

The first region AR1 will be explained further in reference to FIG. 2.

For the direction, in reference to the vehicle 1, wherein there is a danger of contact between the vehicle 1 and the moving body MS, the image generating unit 135 displays with emphasis the boundary line CF around the first region AR1 and the second region AR2 wherein the surroundings information image PS is displayed.

As the emphasized display of the boundary line CF, the display image generating unit 135 displays the color of the boundary line CF in a color (for example, red, yellow, or the like), for example, that is different from that of another part of the boundary line CF, for the direction, in reference to the vehicle 1, wherein there is a danger of contact of the vehicle 1.

The boundary line CF will be explained further in reference to FIG. 2 through FIG. 10. Note that in FIG. 2 through FIG. 10 the emphasized display of the boundary line CF is indicated as a direction indicator CFE. The direction indicator CFE includes a first direction indicator CFR and a second direction indicator CFY.

While, in the present embodiment, a case will be explained wherein, as the emphasized display of the boundary line CF, the color of the boundary line CF in the direction wherein there is a danger of contact by the vehicle 1 is displayed in a color different from other parts of the boundary line CF, there is no limitation thereto. For example, the emphasized display of the boundary line CF may be through flashing the display of the boundary line CF in the direction wherein there is a danger of contact of the vehicle 1. This can improve the ability of the user to recognize the boundary line CF in the direction wherein there is a danger of contact with the vehicle 1.

The display controlling unit 136 displays, on the display panel 61, the display image PD that is generated by the display image generating unit 135.

The display image PD will be explained further in reference to FIG. 2 through FIG. 10.

While, in the present embodiment, a case will be explained wherein the display controlling unit 136 displays the display image PD filling the entire display surface of the display panel 61, there is no limitation thereto. The display controlling unit 136 may instead display the display image PD in a region that is a portion of the display surface of the display panel 61.

A specific example of a display image PD displayed on the display panel 61 will be explained next in reference to FIG. 2 through FIG. 10.

Ordinal directions are shown in each FIG. 2 through FIG. 10. Upward in the figures corresponds to north; downward in the figures corresponds to south; to the right in the figures corresponds to the east; and to the left in the figures corresponds to west.

Figure 2:
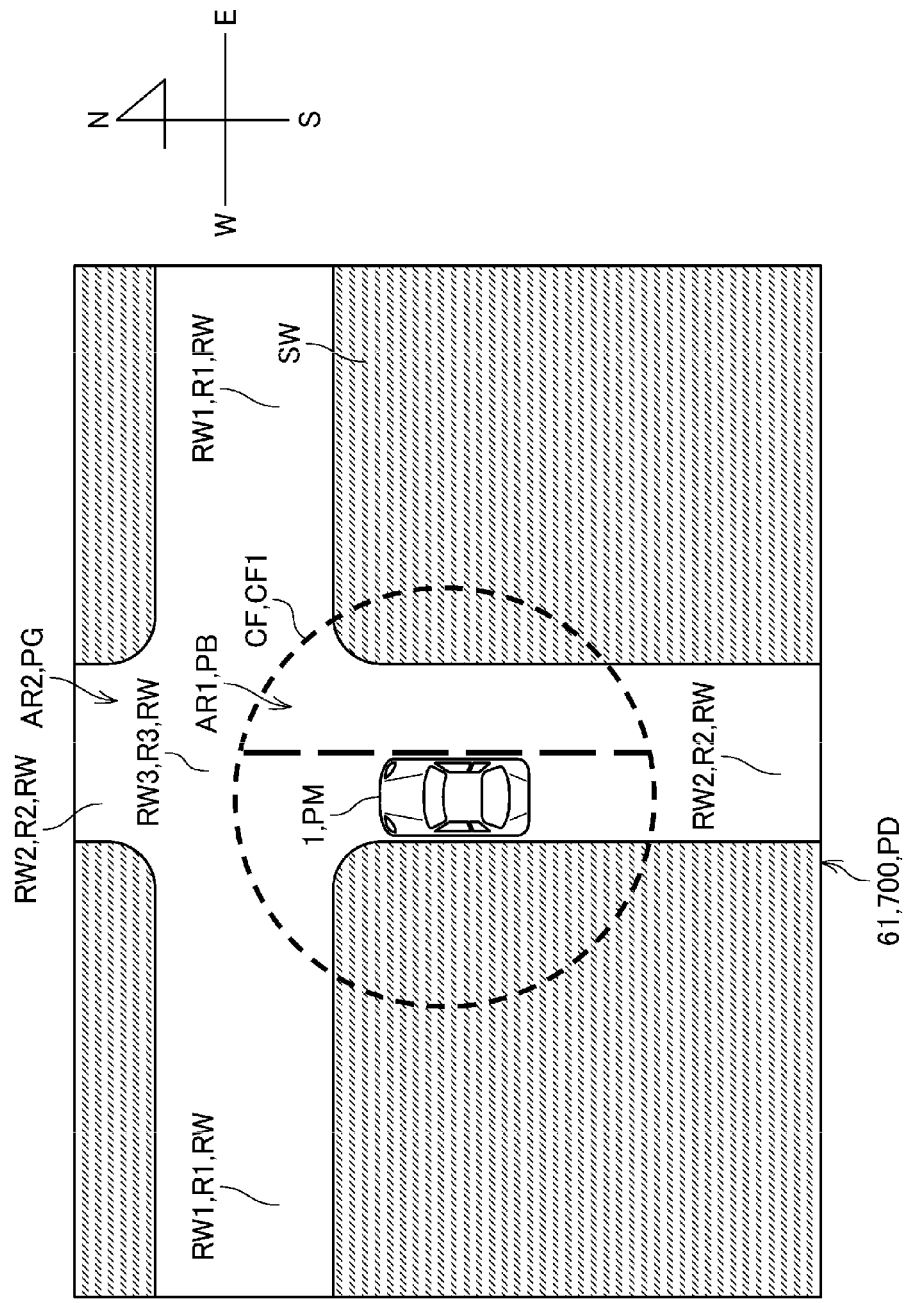
FIG. 2 is a screenshot showing an example of a first screen displaying a display image of a first state.

FIG. 2 is a screenshot of an example of a first screen 700 that displays the display image PD in a first state. The first screen 700 is displayed by the display controlling unit 136 on the display panel 61.

In the first screen 700, the vehicle mark PM and the overhead image PB are displayed in a first region AR1, a map image PG is displayed in a second region AR2, and a boundary line CF is displayed at the boundary between the first region AR1 and the second region AR2.

The map image PG includes a road image RW and a sidewalk image SW. The road image RW includes a first road image RW1 showing a first road R1 that extends in the east-west direction, a second road image RW2 showing a second road R2 that extends in the north-south direction, and an intersection image RW3 showing an intersection R3 wherein the first road R1 and the second road R2 intersect.

Note that, in the present embodiment, no traffic signal is located at the intersection R3.

As illustrated in FIG. 2, the vehicle 1 is traveling northbound on the second road R2, approaching the intersection R3.

In the first state, the distance sensor 40 does not detect a moving body MS. Given this, the danger detecting unit 134 detects that there is no moving body MS for which there is a danger of contact with the vehicle 1. In this case, the display image generating unit 135 displays the boundary line CF in a first color that indicates that there is no danger of the vehicle 1 making contact with a moving body MS.

The display image generating unit 135 displays the boundary line CF in green, for example. Green corresponds to an example of a "first color." In other words, the boundary line CF being displayed in green indicates that there is no danger of the vehicle 1 coming into contact with a moving body MS. For convenience, in FIG. 2 the boundary line CF being green is indicated by a dotted line. A boundary line CF that is displayed in green will be described as a "first boundary line CF1."

The overhead image PB is displayed in the first region AR1. The first region AR1 is a circular region that includes the vehicle 1. The overhead image PB is generated through combining the captured images captured by the front camera 31, the rear camera 33, the left side camera 35, and the right side camera 37 after projective transformation. Given this, if the overhead image PB were displayed as a rectangular image, there would be large distortion of the image at locations corresponding to the corners of the rectangular image, and an image would be generated that is discontinuous at the interface with the map image PG.

In contrast, in the present embodiment the images located corresponding to the four corners of the rectangular image generated as the overhead image PB are cut off, to generate a circular overhead image PB. The locations wherein there would be large distortion are not included in the circular overhead image PB. This enables the overhead image PB to be joined to the map image PG smoothly.

As explained in reference to FIG. 2, because the display controlling unit 136 displays the boundary line CF using the first boundary line CF1 that shows that there is no danger of the vehicle 1 contacting the moving body MS, the user can recognize visually that there is no danger of the vehicle 1 coming into contact a moving body MS.

Figure 3:
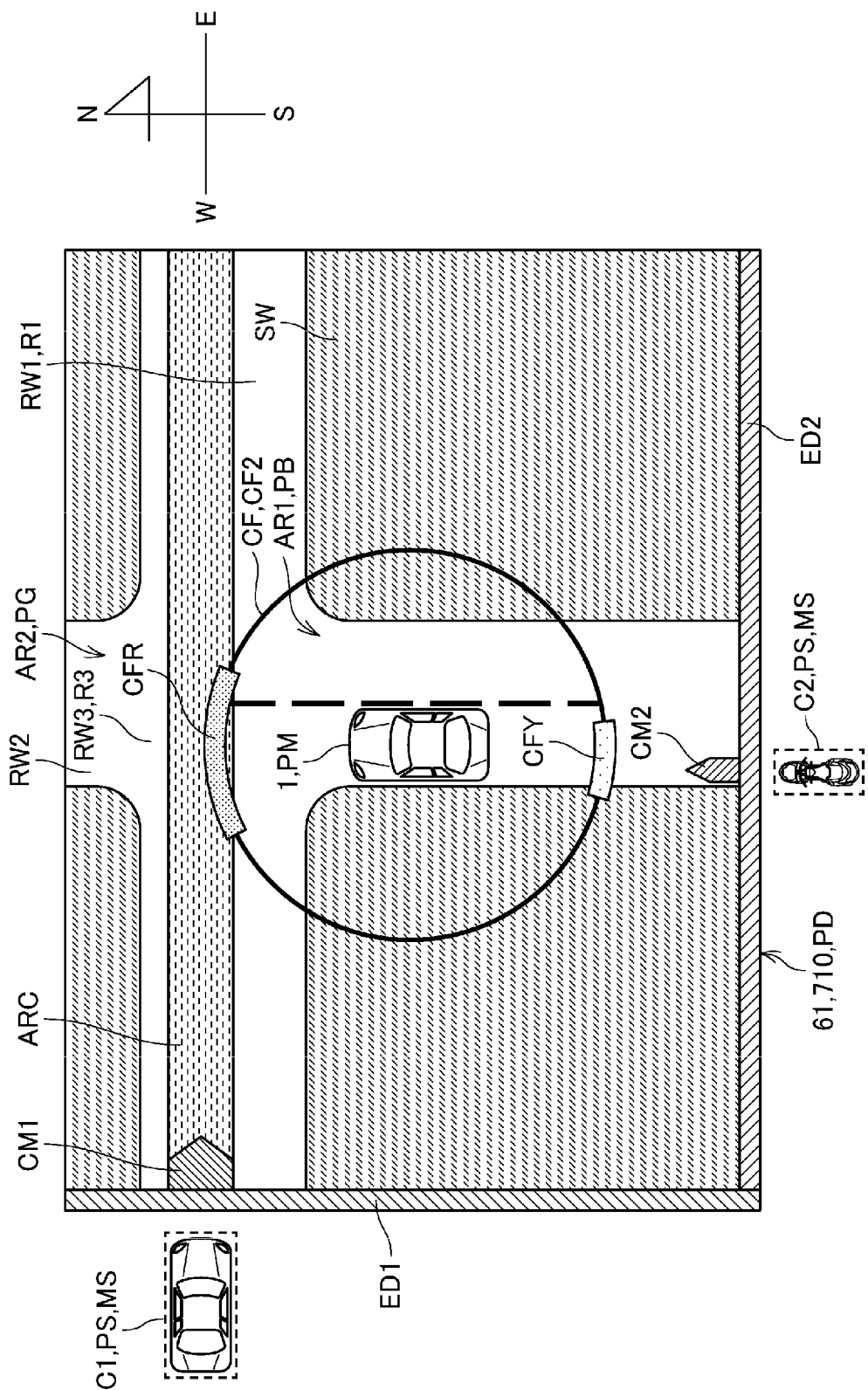
FIG. 3 is a screenshot showing an example of a second screen displaying a display image of a second state.

FIG. 3 is a screenshot of an example of a second screen 710 that displays the display image PD in a second state. The second screen 710 is displayed by the display controlling unit 136 on the display panel 61.

As with the first screen 700 depicted in FIG. 2, the vehicle mark PM and the overhead image PB are displayed in the first region AR1 in the second screen 710.

In the second screen 710, the map image PG, the first vehicle mark CM1, the second vehicle mark CM2, the first danger detected indicator ED1, the second danger detected indicator ED2, and a collision danger image ARC are displayed by the display controlling unit 136 in the second region AR2.

The first vehicle mark CM1 indicates a first vehicle C1 that is traveling eastbound on the first road R1 that extends in the east-west direction, approaching the intersection R3. The first vehicle C1 corresponds to an example of a moving body MS that is detected by the distance sensor 40.

The first vehicle C1 is not included in a region that is shown in the map image PG that is displayed on the display panel 6, and a danger of contact with the vehicle 1 is detected by the danger detecting unit 134. In this case, the display image generating unit 135 places the first vehicle mark CM1 on the road in the direction ahead of the first vehicle C1 on the map image PG. The display image generating unit 135 places the first vehicle mark CM1, for example, at the west end (the left end in FIG. 3) of the first road image RW1.

When the danger detecting unit 134 has detected that the first vehicle C1, detected by the distance sensor 40, has a danger of contacting the vehicle 1, the display controlling unit 136 displays the first danger detected indicator ED1. The display controlling unit 136 displays the first danger detected indicator ED1 at the end portion of the display panel 61 in the direction, in reference to the vehicle 1, wherein there is a danger of contact with the vehicle 1 (the direction to the left in the present embodiment).

In the present embodiment the user is notified of the direction wherein a danger of contact of the vehicle 1 has been detected, through the display controlling unit 136 flashing the vicinity of the left edge of the display panel 61 in red, at prescribed time intervals, as the first danger detected indicator ED1. The prescribed time intervals are, for example, intervals of 3 seconds.

Note that the color of the first danger detected indicator ED1 is determined depending on the degree of danger of the first vehicle C1 contacting the vehicle 1. The degree of danger of the first vehicle C1 contacting the vehicle 1 is detected by the danger detecting unit 134. In the present embodiment, a high danger of the first vehicle C1 contacting the vehicle 1 is detected, so the color of the first danger detected indicator ED1 is determined to be, for example, red.

The collision danger image ARC is an image that is generated by the image generating unit 135, and displayed by the display controlling unit 136 when the travel speed of the first vehicle C1 is no less than a first speed. The collision danger image ARC is an image that shows the direction in which the first vehicle C1 is traveling, and the range over which there is a danger of a collision. The first speed is, for example, 70 km/h. The travel speed of the first vehicle C1 is, for example, 80 km/h.

The collision danger image ARC is displayed semi-transparently in red, for example, on the first road image RW1.

The collision danger image ARC is displayed as a rectangular image that extends in the east-west direction, for example. The width of the collision danger image ARC (the short edge direction, that is, the size in the north-south direction) indicates, for example, the width of the first vehicle C1.

The second vehicle mark CM2 indicates a second vehicle C2 that is traveling northbound on the second road R2 that extends in the north-south direction, approaching the intersection R3. The second vehicle C2 corresponds to an example of a moving body MS that is detected by the distance sensor 40. The travel speed of the second vehicle C2 is less than the first speed and no less than a second speed. The second speed is, for example, 30 km/h. The travel speed of the second vehicle C2 is, for example, 40 km/h.

The second vehicle C2 is not included in a region that is shown in the map image PG that is displayed on the display panel 6, and a danger of contact with the vehicle 1 is detected by the danger detecting unit 134. In this case, the surroundings information image generating unit 131 places the second vehicle mark CM2 on the road in the direction ahead of the second vehicle C2 on the map image PG. The surroundings information image generating unit 131 places the second vehicle mark CM2, for example, at the south end (the bottom end in FIG. 3) of the second road image RW2.

When the danger detecting unit 134 has detected that the second vehicle C2, detected by the distance sensor 40, has a danger of contacting the vehicle 1, the image generating unit 135 generates a second danger detected indicator ED2, and the display controlling unit 136 displays the second danger detected indicator ED2. The display controlling unit 136 displays the second danger detected indicator ED2 at the end portion of the display panel 61 in the direction, in reference to the vehicle 1, wherein there is a danger of contact with the vehicle 1 (the direction toward the bottom in the present embodiment).

In the present embodiment the user is notified of the direction wherein a danger of contact of the vehicle 1 has been detected, through the display controlling unit 136 flashing the vicinity of the bottom edge of the display panel 61 in yellow, at prescribed time intervals, as the second danger detected indicator ED2. The prescribed time intervals are, for example, intervals of 3 seconds.

Note that the color of the second danger detected indicator ED2 is determined depending on the degree of danger of the second vehicle C2 contacting the vehicle 1. The degree of danger of the second vehicle C2 contacting the vehicle 1 is detected by the danger detecting unit 134. In the present embodiment, a moderate danger of the second vehicle C2 contacting the vehicle 1 is detected, so the color of the second danger detected indicator ED2 is determined to be yellow.

When no distinction is made between the first danger detected indicator ED1 and the second danger detected indicator ED2, the description may be of a "danger detected indicator ED" in the explanation below.

The first direction indicator CFR and second direction indicator CFY are also displayed superimposed on a portion of the boundary line CF in the second screen 710.

The first direction indicator CFR is located on the circumferential boundary line CF by the display image generating unit 135 in the direction, in reference to the vehicle 1, in which there is a danger of the vehicle 1 contacting the first vehicle C1. The direction wherein there is a danger of the vehicle 1 contacting the first vehicle C1 is found by the danger detecting unit 134 as, for example, the range wherein the boundary line CF overlaps the collision danger image ARC. The first direction indicator CFR is displayed by the display image generating unit 135 as, for example, a red arc-shaped image.

Note that the color of the first direction indicator CFR is determined depending on the degree of danger of contact between the first vehicle C1 and the vehicle 1. The degree of danger of the first vehicle C1 contacting the vehicle 1 is detected by the danger detecting unit 134. In the present embodiment, a high danger of the first vehicle C1 contacting the vehicle 1 is detected, so the color of the first direction indicator CFR is determined to be red. The color of the first direction indicator CFR being red is indicated by the heavy hatching.

The second direction indicator CFY is located on the circumferential boundary line CF by the display image generating unit 135 in the direction, in reference to the vehicle 1, in which there is a danger of the vehicle 1 contacting the second vehicle C2. The direction in which there is danger of the vehicle 1 contacting the second vehicle C2 is found, by the danger detecting unit 134 as, for example, the direction, in reference to the vehicle 1, in which the second vehicle C2 is located (which here is the direction toward the south).

The second direction indicator CFY is displayed by the display image generating unit 135 as, for example, a yellow arc-shaped image.

Note that the color of the second direction indicator CFY is determined depending on the degree of danger of contact between the second vehicle C2 and the vehicle 1. The degree of danger of the second vehicle C2 contacting the vehicle 1 is detected by the danger detecting unit 134. In the present embodiment, a moderate danger of the second vehicle C2 contacting the vehicle 1 is detected, so the color of the second direction indicator CFY is determined to be yellow. The color of the second direction indicator CFY being yellow is indicated by the light hatching.

When no distinction is made between the first direction indicator CFR and the second direction indicator CFY, the description may be of a "direction indicator CFE" in the explanation below.

Because the first direction indicator CFR and the second direction indicator CFY are to be displayed superimposed on a portion of the boundary line CF, the color of the boundary line CF is displayed by the display image generating unit 135 in an inconspicuous color. The boundary line CF is displayed, for example, in gray by the display image generating unit 135. A boundary line CF that is displayed in gray may be described as a "second boundary line CF2."

As explained in reference to FIG. 3, the display controlling unit 136 displays the first danger detected display ED1 in the vicinity of the left edge of the display panel 61, enabling the user to recognize visually that a moving body MS wherein there is a danger of contact with the vehicle 1 has been detected in the direction to the west of the vehicle 1.

Additionally, the display controlling unit 136 displays the first danger detected indicator ED1 in red, enabling the user to recognize visually that the danger of contact with the vehicle 1 is high.

As explained in reference to FIG. 3, the display controlling unit 136 displays the second danger detected display ED2 in the vicinity of the bottom edge of the display panel 61, enabling the user to recognize visually that a moving body MS wherein there is a danger of contact with the vehicle 1 has been detected in the direction to the self of the vehicle 1.

Additionally, the display controlling unit 136 displays the second danger detected indicator ED2 in yellow, enabling the user to recognize visually that the danger of contact with the vehicle 1 is moderate.

As explained in reference to FIG. 3, the display controlling unit 136 displays the collision danger image ARC semi-transparently in red on the first road image RW1, enabling the user to recognize visually that the travel speed of the first vehicle C1 corresponding to the collision danger image ARC is no less than the first speed.

As explained in reference to FIG. 3, the display controlling unit 136 displays the first direction indicator CFR as an arc-shaped image in the range wherein the boundary line CF overlaps the collision danger image ARC, enabling the user to recognize visually the direction in which there is a danger of contact with the vehicle 1. Moreover, the display controlling unit 136 displays the first direction indicator CFR as a red arc-shaped image, enabling visual recognition that there is a high danger of contact with the vehicle 1 in the direction indicated by the first direction indicator CFR.

As explained in reference to FIG. 3, the display controlling unit 136 displays the second direction indicator CFY as an arc-shaped image in the direction, in respect to the vehicle 1, in which the second vehicle C2 is located, enabling the user to recognize visually the direction in which there is a danger of contact with the vehicle 1. Moreover, the display controlling unit 136 displays the second direction indicator CFY as a yellow arc-shaped image, enabling visual recognition that there is a moderate danger of contact with the vehicle 1 in the direction indicated by the second direction indicator CFY.

Figure 4:
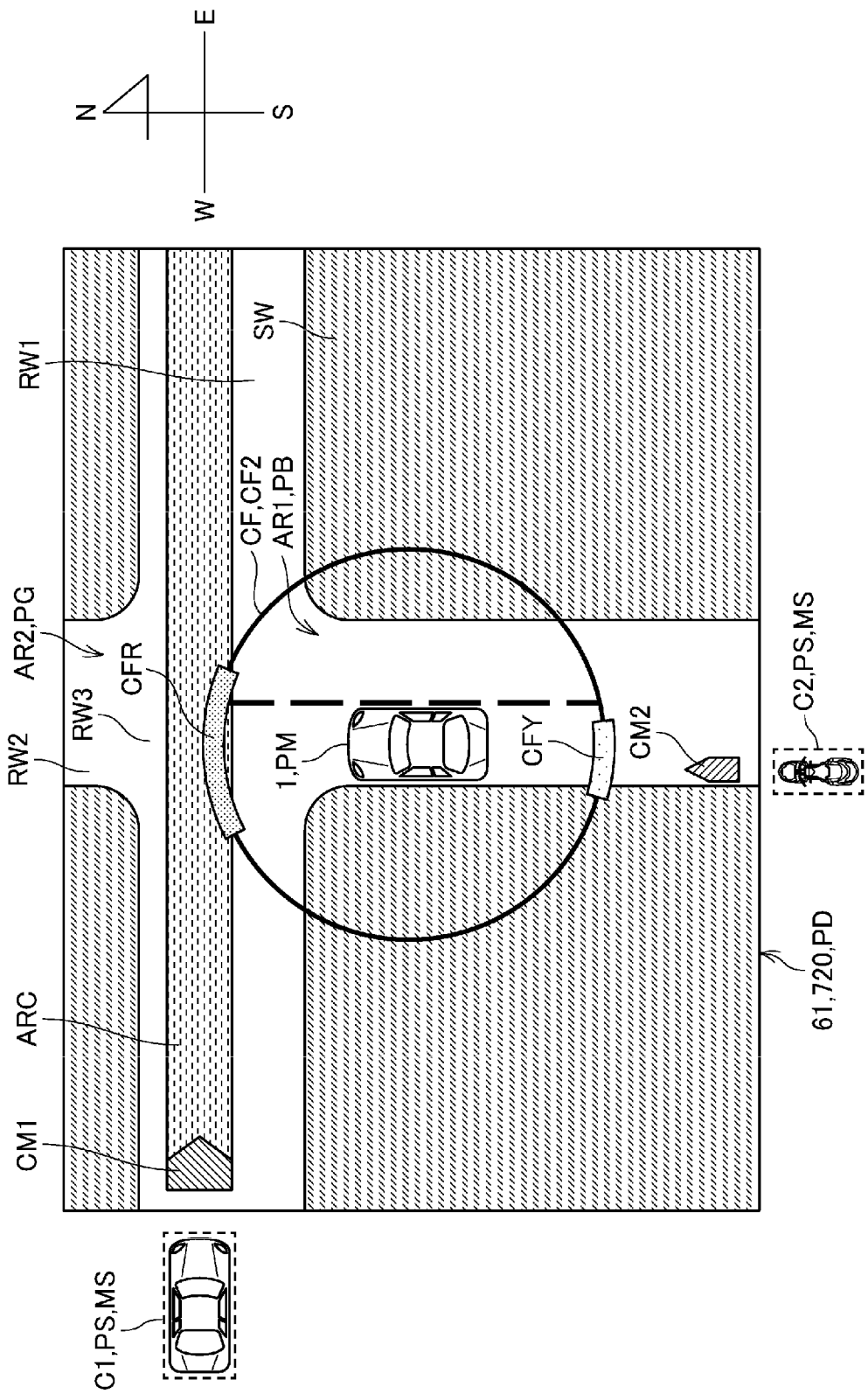
FIG. 4 is a screenshot showing an example of a third screen displaying a display image of a third state.

FIG. 4 is a screenshot of an example of a third screen 720 that displays the display image PD in a third state. The third screen 720 is displayed by the display controlling unit 136 on the display panel 61.

The difference, from the second screen 710 shown in FIG. 3, is the point that the first danger detected indicator ED1 and the second danger detected indicator ED2 are not displayed in the third screen 720. In other words, the third state is a state wherein a prescribed time interval has elapsed since the second state.

After the display controlling unit 136 has flashed the first danger detected indicator ED1 and the second danger detected indicator ED2 at prescribed time intervals, the display of the first danger detected indicator ED1 and the second danger detected indicator ED2 on the display panel 61 is ended. The result is that the first danger detected indicator ED1 and the second danger detected indicator ED2 are not displayed, as shown in the third screen 720 of FIG. 4.

As explained in reference to FIG. 4, after the display controlling unit 136 has flashed the first danger detected indicator ED1 and the second danger detected indicator ED2 at prescribed time intervals, the display of the first danger detected indicator ED1 and the second danger detected indicator ED2 on the display panel 61 is ended. Consequently, this can prevent the overall readability of the display image PD as a whole being reduced by the focus of the user concentrating on the first danger detected indicator ED1 and the second danger detected indicator ED2 through the first danger detected indicator ED1 and the second danger detected indicator ED2 being displayed flashing.

Figure 5:
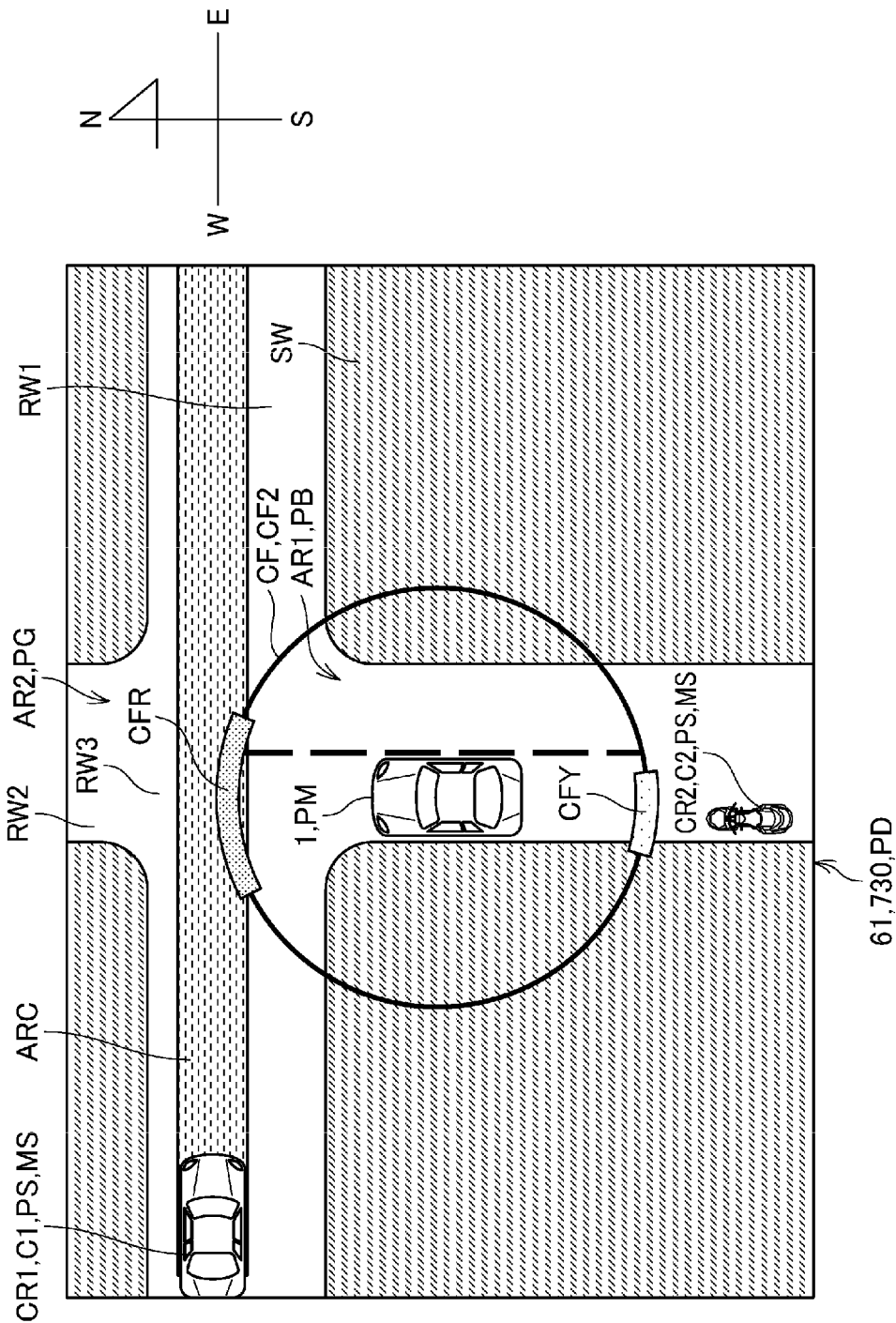
FIG. 5 is a screenshot showing an example of a fourth screen displaying a display image of a fourth state.

FIG. 5 is a screenshot of an example of a fourth screen 730 that displays the display image PD in a fourth state. The fourth screen 730 is displayed by the display controlling unit 136 on the display panel 61.

The difference from the third screen 720 is that in the fourth screen 730 the first vehicle image CR1 is displayed instead of the first vehicle mark CM1, and the second vehicle image CR2 is displayed instead of the second vehicle mark CM2.

In the fourth state, the first vehicle C1 has moved from a location that is not included in a region that is shown in the map image PG that is displayed on the display panel 6 to a location that is included in a region that is shown in the map image PG that is displayed on the display panel 6. Given this, the display controlling unit 136 displays the first vehicle image CR1 instead of the first vehicle mark CM1.

The first vehicle image CR1 is generated by the surroundings information image generating unit 131 based on the shape and size of the first vehicle C1, detected by the distance sensor 40. For example, the surroundings information image generating unit 131 generates the first vehicle image CR1 by reading out the first vehicle image CR1 from a plurality of vehicle images that are stored in the image storing unit 142, based on the shape and size of the first vehicle C1, detected by the distance sensor 40. In the present embodiment, the first vehicle C1 is a passenger vehicle with four wheels, for example, so the first vehicle image CR1 is an image showing a passenger vehicle with four wheels.

In the fourth state, the second vehicle C2 has moved from a location that is not included in a region that is shown in the map image PG that is displayed on the display panel 6 to a location that is included in a region that is shown in the map image PG that is displayed on the display panel 6. Given this, the display controlling unit 136 displays the second vehicle image CR2 instead of the second vehicle mark CM2.

The second vehicle image CR2 is generated by the surroundings information image generating unit 131 based on the shape and size of the second vehicle C2, detected by the distance sensor 40. For example, the surroundings information image generating unit 131 generates the second vehicle image CR2 by reading out the second vehicle image CR2 from a plurality of vehicle images that are stored in the image storing unit 142, based on the shape and size of the second vehicle C2, detected by the distance sensor 40. The second vehicle C2 is, for example, a motorcycle, so the second vehicle image CR2 is an image showing a motorcycle.

As explained in reference to FIG. 5, when the first vehicle C1 has moved from a location that is not included in a region that is shown in the map image PG that is displayed on the display panel 6 to a location that is included in a region that is shown in the map image PG that is displayed on the display panel 6, the display controlling unit 136 displays the first vehicle image CR1 instead of the first vehicle mark CM1. This allows the user to recognize the location of the first vehicle C1 visually. That the first vehicle C1 is a passenger vehicle with four wheels can be recognized visually through the first vehicle image CR1.

As explained in reference to FIG. 5, when the second vehicle C2 has moved from a location that is not included in a region that is shown in the map image PG that is displayed on the display panel 6 to a location that is included in a region that is shown in the map image PG that is displayed on the display panel 6, the display controlling unit 136 displays the second vehicle image CR2 instead of the second vehicle mark CM2. This allows the user to recognize the location of the second vehicle C2 visually. That the second vehicle C2 is a motorcycle can be recognized visually through the second vehicle image CR2.

Figure 6:
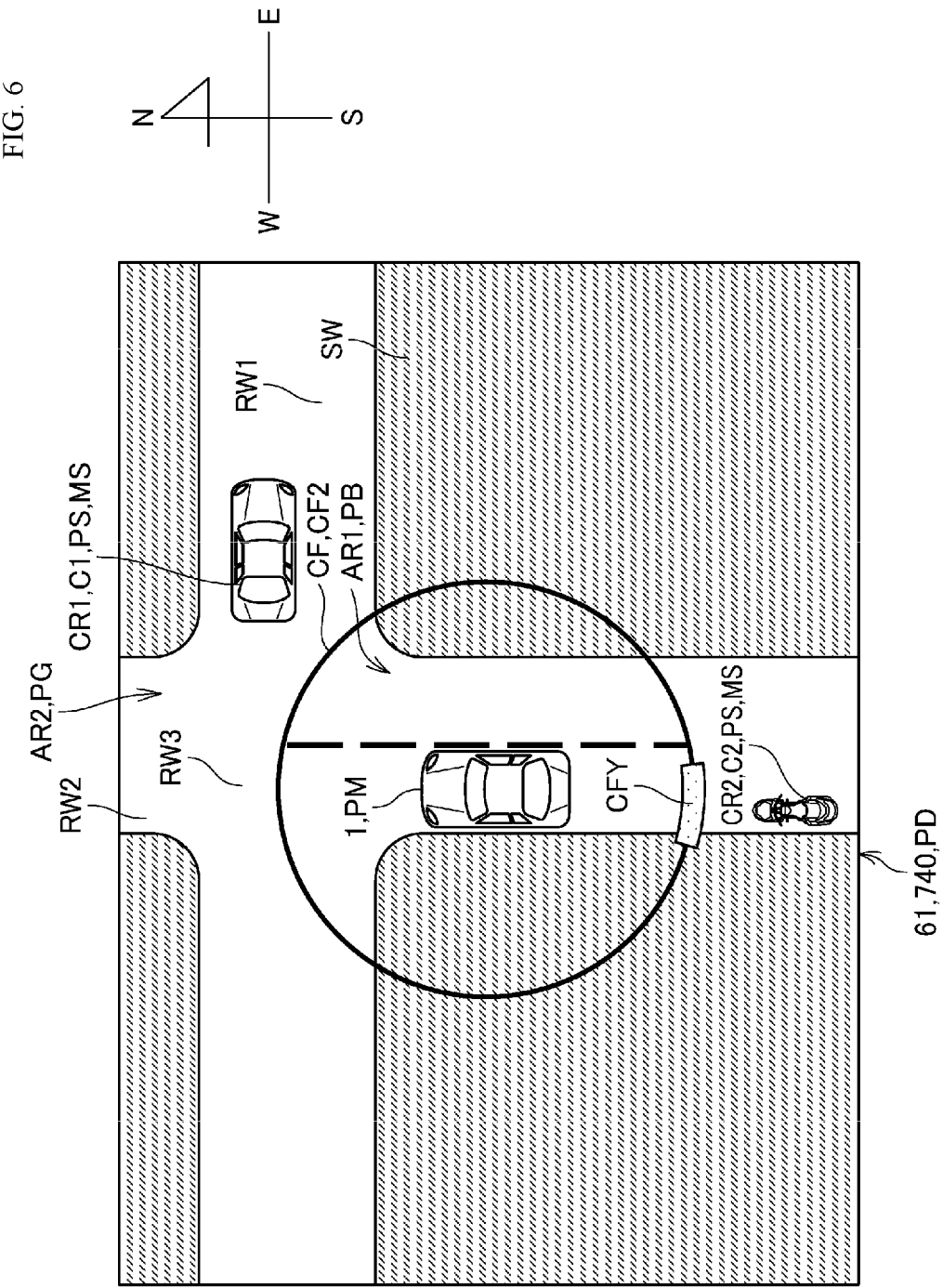
FIG. 6 is a screenshot showing an example of a fifth screen displaying a display image of a fifth state.

FIG. 6 is a screenshot of an example of a fifth screen 740 that displays the display image PD in a fifth state. The fifth screen 740 is displayed by the display controlling unit 136 on the display panel 61.

The difference from the fourth screen 730 that shows the fourth state is the point that, in the fifth screen 740 that shows the fifth state, the first vehicle C1 has passed through the intersection R3.

Because, in the fifth state, the first vehicle C1 has passed through the intersection R3, the display image generating unit 135 places the first vehicle image CR1 to the east of the intersection image RW3.

Moreover, because the first vehicle C1 has passed through the intersection R3, the danger detecting unit 134 detects that there is no danger of the first vehicle C1 contacting the vehicle 1. Given this, the display image generating unit 135 does not display the collision danger image ARC or the first direction indicator CFR.

As explained in reference to FIG. 6, if the first vehicle C1 has passed through the intersection R3, the collision danger image ARC and the first direction indicator CFR are not displayed. This enables the user to recognize visually that there is no danger of contact with the first vehicle C1.

Figure 7:
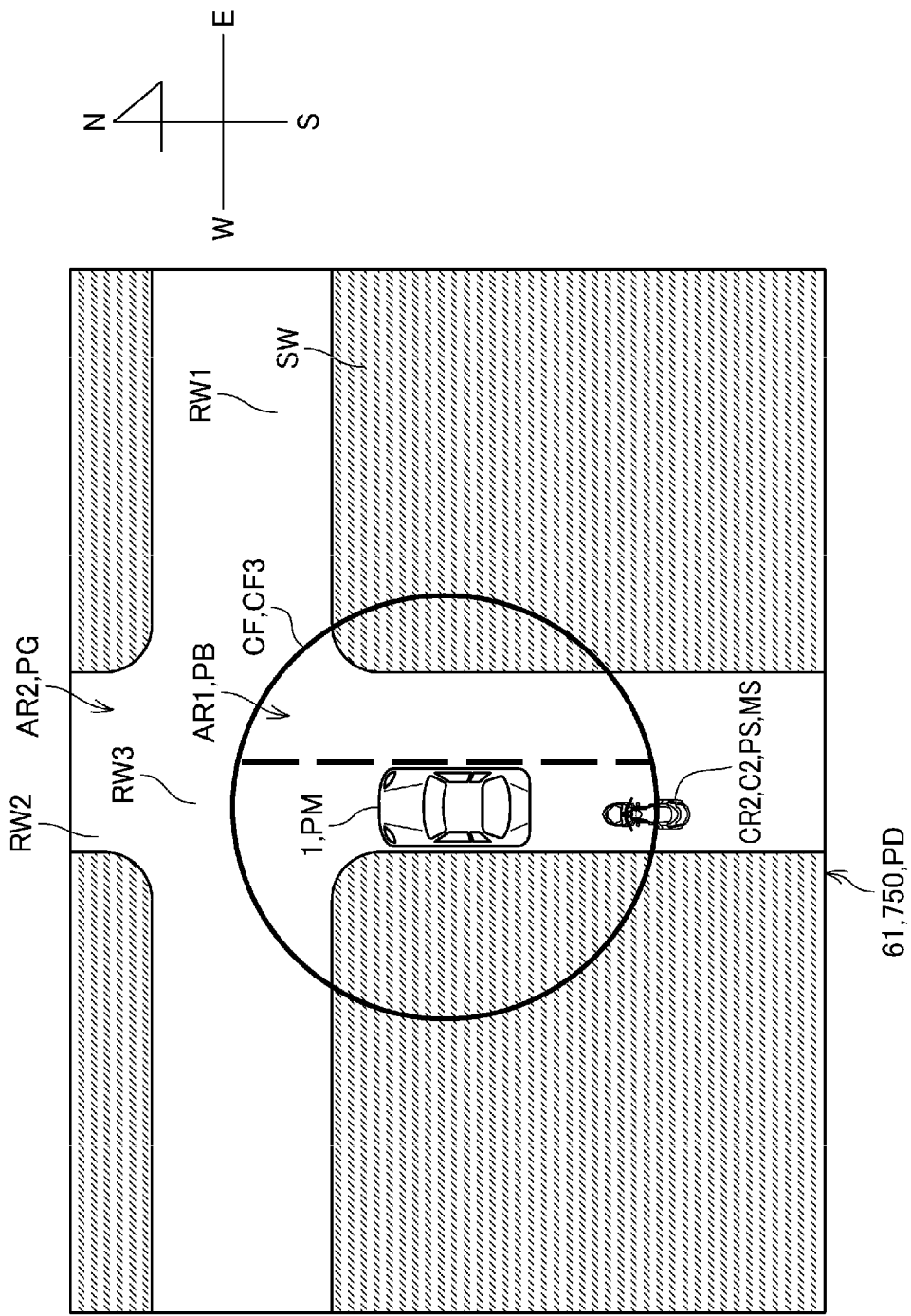
FIG. 7 is a screenshot showing an example of a sixth screen displaying a display image of a sixth state.

FIG. 7 is a screenshot of an example of a sixth screen 750 that displays the display image PD in a sixth state. The sixth screen 750 is displayed by the display controlling unit 136 on the display panel 61.

The difference, from the fifth screen 740 that shows the fifth state, is the point that, in the sixth screen 750 that shows the sixth state, a portion of the second vehicle C2 is located within the boundary line CF.

Because in the sixth state a portion of the second vehicle C2 is located within the boundary line CF, the display image generating unit 135 does not display the second direction indicator CFY. Additionally, the danger detecting unit 134 detects that the danger of contact of the second vehicle C2 with the vehicle 1 is high. Given this, the display controlling unit 136 displays the boundary line CF with emphasis. The display controlling unit 136 displays the boundary line CF in red, for example. A boundary line CF that is displayed in red may be described as a "third boundary line CF3."

As explained in reference to FIG. 7, when a portion of the second vehicle C2 is located within the boundary line CF, the boundary line CF is displayed in red. This enables the user to recognize visually that the danger of contact with the second vehicle C2 is high.

Figure 8:
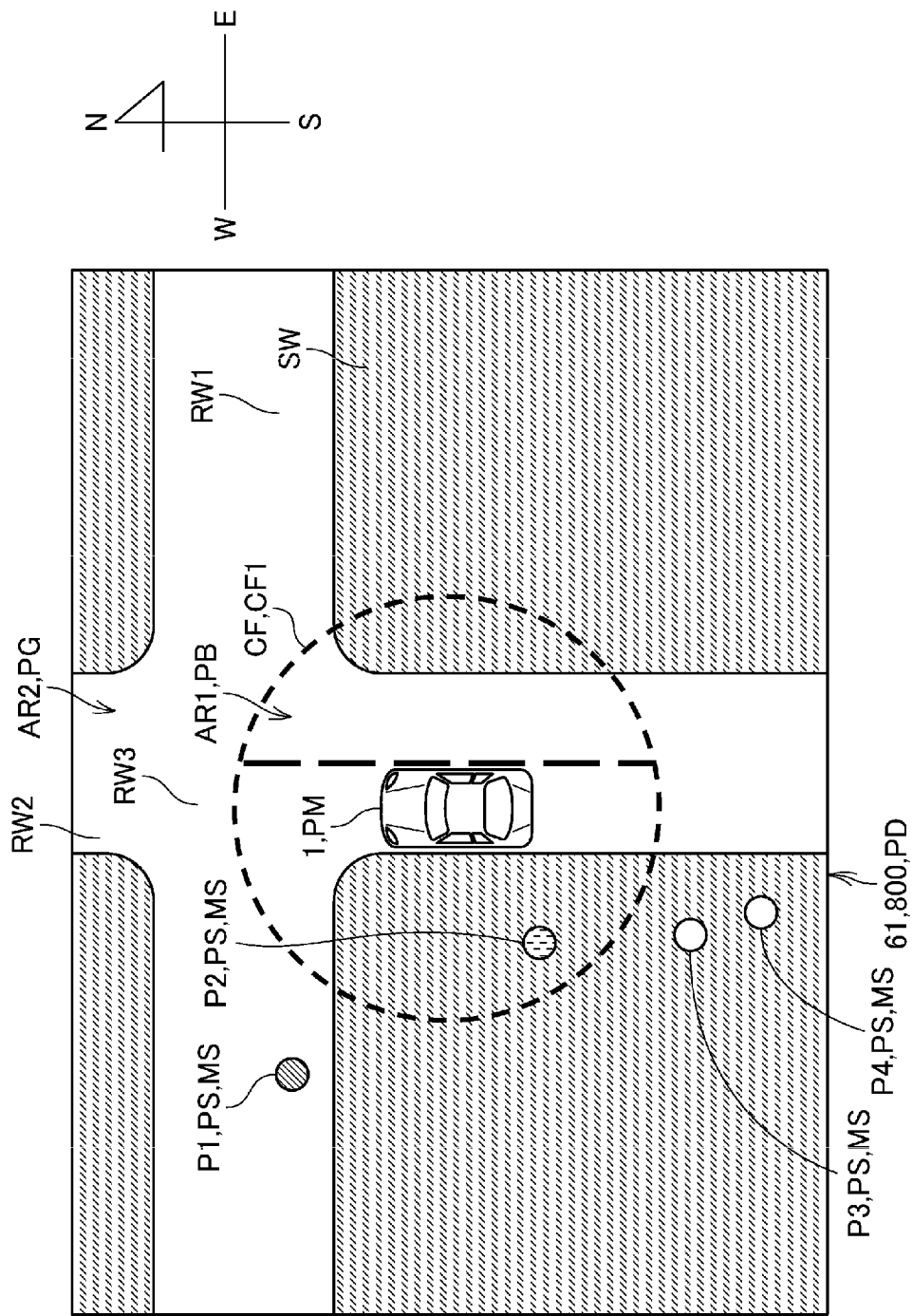
FIG. 8 is a screenshot showing an example of a seventh screen displaying a display image of a seventh state.

FIG. 8 is a screenshot of an example of a seventh screen 800 that displays the display image PD in a seventh state.

The seventh screen 800 is displayed by the display controlling unit 136 on the display panel 61.

Figure 10:
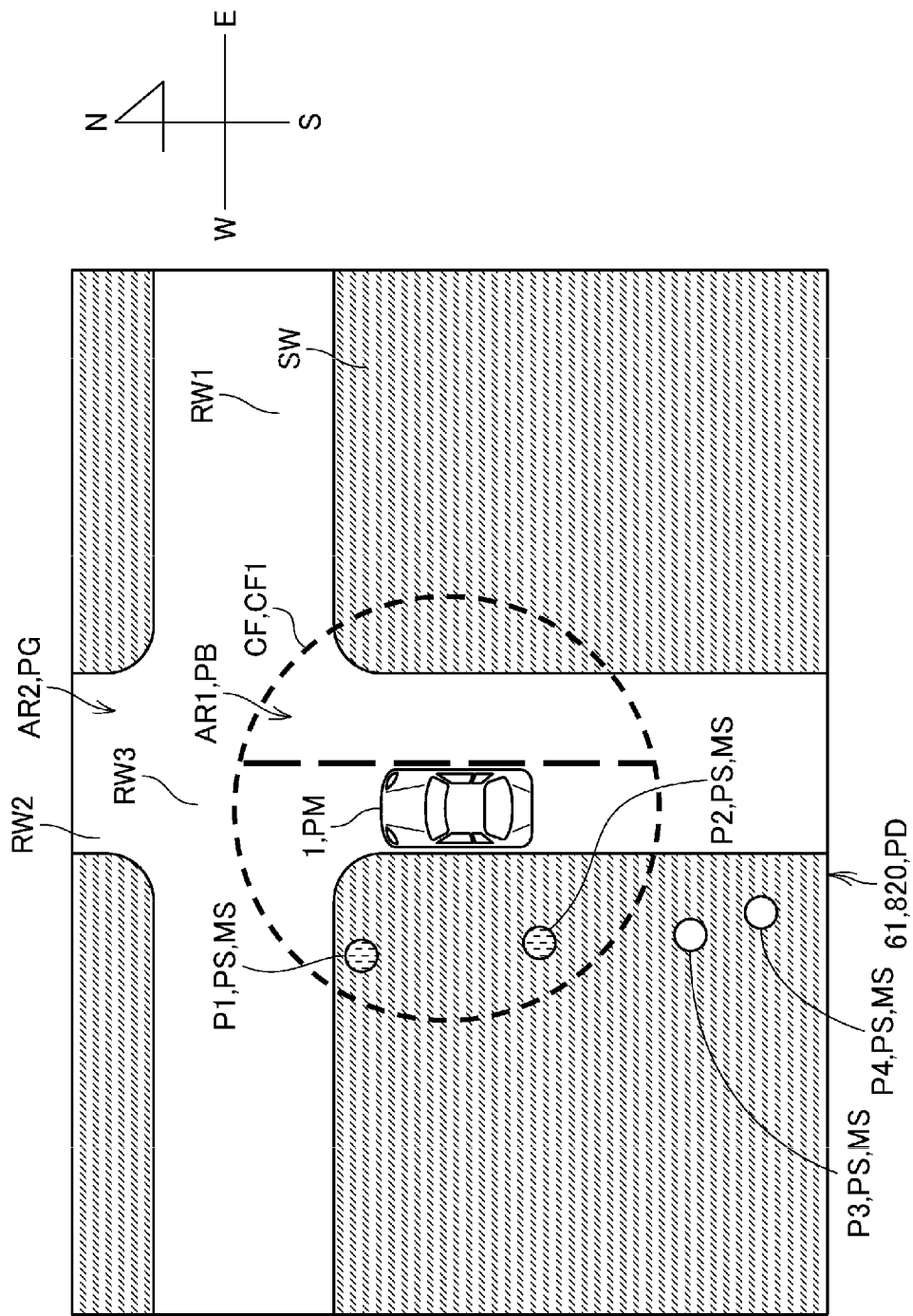
FIG. 10 is a screenshot showing an example of a ninth screen displaying a display image of a ninth state.

In the second state, shown in FIG. 3, through the sixth state, shown in FIG. 7, the explanations were for cases wherein the distance sensor 40 detected a first vehicle C1 and/or a first vehicle C1, but, in the seventh state, shown in FIG. 8, through the ninth state, shown in FIG. 10, the explanation will be for a case wherein the distance sensor 40 detects a pedestrian, rather than detecting a vehicle C.

As illustrated in FIG. 8, the surroundings information image generating unit 131 generates, as the surroundings information image PS, a first pedestrian mark P1, a second pedestrian mark P2, a third pedestrian mark P3, and a fourth pedestrian mark P4. Each of the first pedestrian mark P1 through the fourth pedestrian mark P4 are circle-shaped marks.

In the first road image RW1, the first pedestrian mark P1 is located to the west of the intersection image RW3. The first pedestrian mark P1 is located in the first road image RW1, and so, for example, is displayed in red, indicating a high need for the user to exercise caution.

The second pedestrian mark P2 is located in a sidewalk image SW within the first region AR1, so, for example, is displayed in yellow, indicating that there is a moderate need for the user to exercise caution.

The third pedestrian mark P3 and the fourth pedestrian mark P4 are located on the sidewalk image SW, and so, for example, are displayed in gray, indicating that there is a low need for the user to exercise caution.

The danger detecting unit 134 detects a low danger of each of the pedestrians, corresponding to the first pedestrian mark P1 through the fourth pedestrian mark P4, contacting the vehicle 1. Given this, the display controlling unit 136 displays the boundary line CF in the green, for example, indicating that the danger is low. For convenience, in FIG. 8 the boundary line CF being green is indicated by a dotted line.

Figure 9:
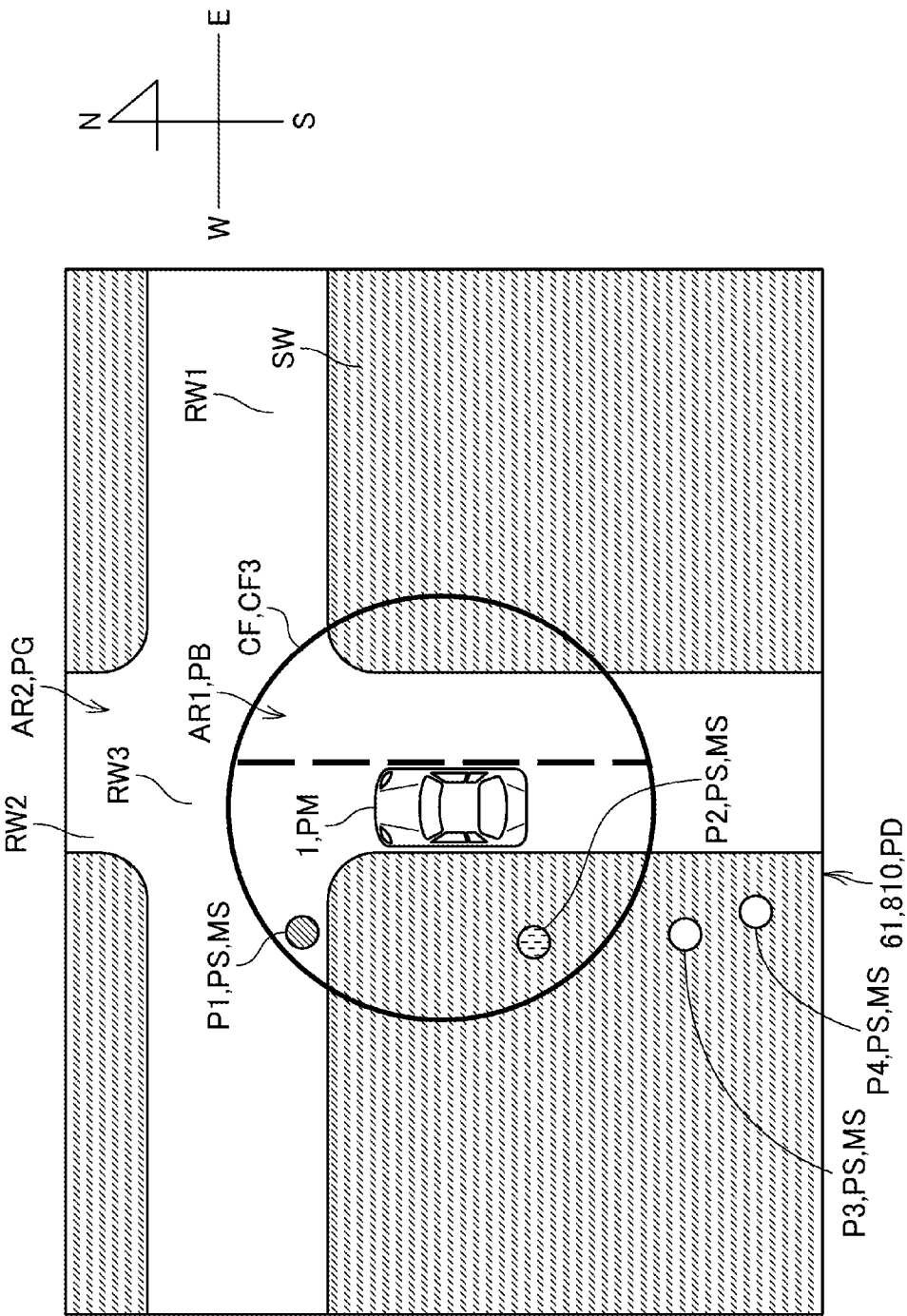
FIG. 9 is a screenshot showing an example of an eighth screen displaying a display image of an eighth state.

FIG. 9 is a screenshot of an example of an eighth screen 810 that displays the display image PD in an eighth state.

The eighth screen 810 is displayed by the display controlling unit 136 on the display panel 61.

While in the seventh state, shown in FIG. 8, the first pedestrian mark P1 was located in the second region AR2, there is a difference in the eighth state, shown in FIG. 9, in that the first pedestrian mark P1 is located in the first region AR1.

Because the first pedestrian mark P1 is located in the first region AR1, the danger detecting unit 134 detects that the danger of the pedestrian, corresponding to the first pedestrian mark P1, contacting the vehicle 1 is high. Given this, the display controlling unit 136 displays the boundary line CF in the red, for example, indicating that the danger is high. For convenience, in FIG. 9 the boundary line CF being red is indicated by a solid line.

FIG. 10 is a screenshot of an example of a ninth screen 820 that displays the display image PD in a ninth state.

The ninth screen 820 is displayed by the display controlling unit 136 on the display panel 61.

While in the eighth state, shown in FIG. 9, the first pedestrian mark P1 was located in the first road image RW1, there is a difference in the ninth state, shown in FIG. 10, in that the first pedestrian mark P1 is located in the sidewalk image SW.

The first pedestrian mark P1 is located in a sidewalk image SW within the first region AR1, so, for example, is displayed in yellow, indicating that there is a moderate need for the user to exercise caution.

Because the first pedestrian mark P1 is located in the sidewalk image SW of the first region AR1, the danger detecting unit 134 detects that the danger of the pedestrian, corresponding to the first pedestrian mark P1, contacting the vehicle 1 is low. Given this, the display controlling unit 136 displays the boundary line CF in the green, for example, indicating that the danger is low. For convenience, in FIG. 10 the boundary line CF being green is indicated by a dotted line.

As explained in reference to FIG. 8 through FIG. 10, the danger detecting unit 134 detects danger of a pedestrian coming into contact with the vehicle 1 depending on the location of the pedestrian detected by the distance sensor 40. Given this, the display controlling unit 136 displays the boundary line CF in a color that depends on the danger detected by the danger detecting unit 134. The user is thus able to recognize visually, through the color of the boundary line CF, the degree of danger of a pedestrian coming into contact with the vehicle 1.

Figure 11:
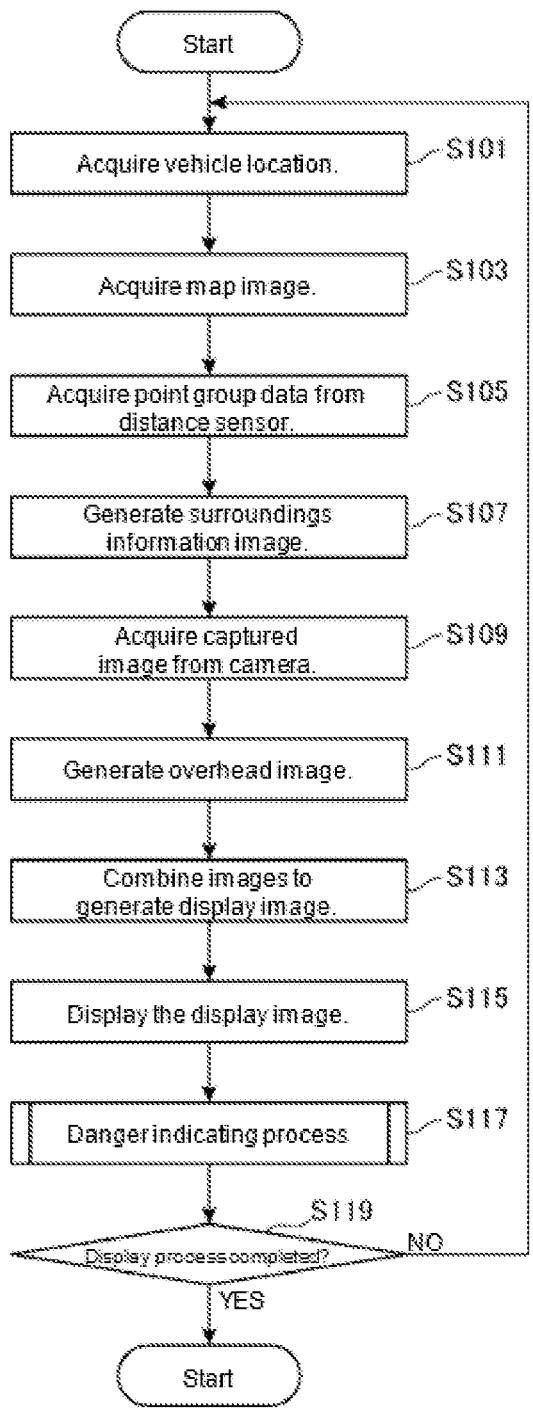
FIG. 11 is a flowchart showing an example of a process for a vehicle surroundings information displaying system.
Figure 12:
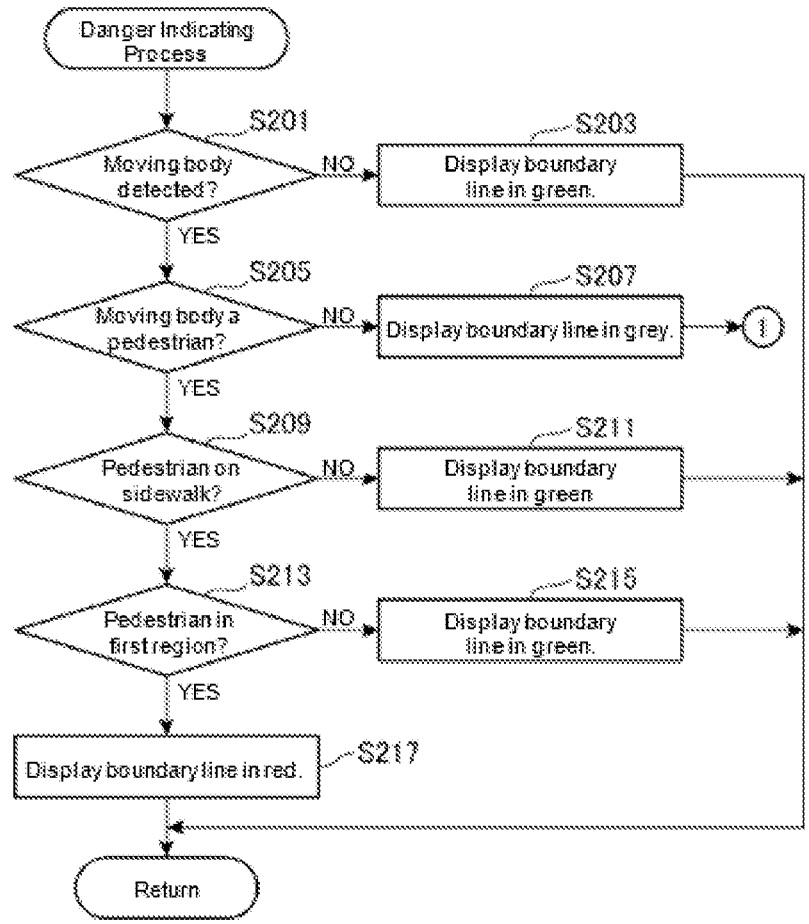
FIG. 12 is a flowchart showing an example for a danger indicating process for a vehicle surroundings information displaying system.
Figure 13:
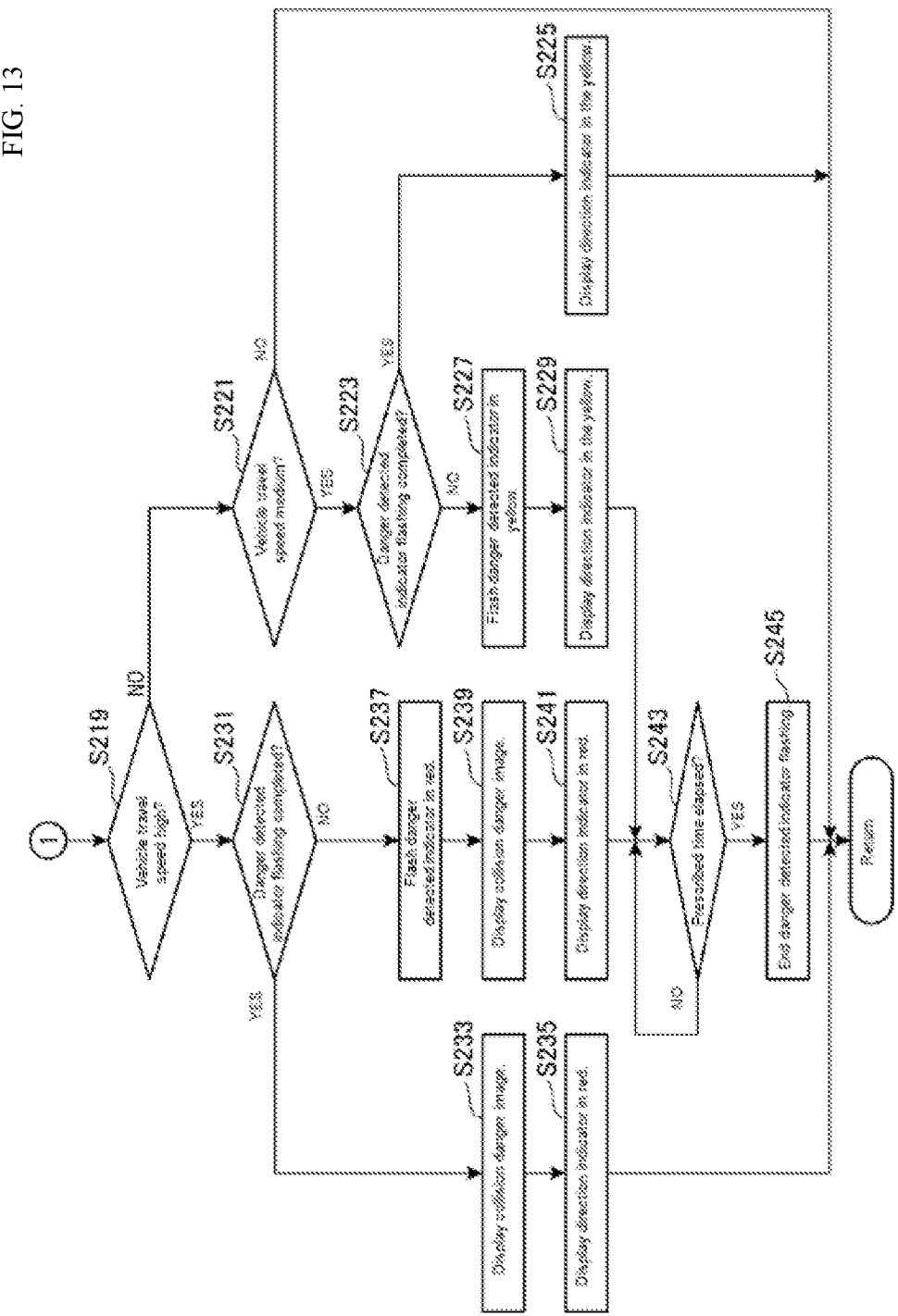
FIG. 13 is a flowchart showing an example for a danger indicating process for a vehicle surroundings information displaying system.

FIG. 11, FIG. 12, and FIG. 13 will be referenced next to explain an example of the vehicle surroundings information displaying process of the vehicle surroundings information displaying system 100.

FIG. 11 is a flowchart showing an example of the process in the vehicle surroundings information displaying system 100.

First, as shown in FIG. 11, the map image acquiring unit 132, in Step S101, acquires, from the location detecting unit 10, location information that indicates the location of the vehicle 1.

Next, in Step S103, the map image acquiring unit 132 acquires a map image PG of the surroundings of the vicinity of the vehicle 1 through reading out, from the map storing unit 141, a map image PG that corresponds to the location image acquired in Step S101.

Next, in Step S105, the surroundings information image generating unit 131 acquires point group data from the distance sensor 40.

Next, in Step S107, the surroundings information image generating unit 131 generates a surroundings information image PS that shows the surroundings information for the vehicle 1, based on the point group data acquired in Step S105.

Next, in Step S109, the overhead image acquiring unit 133 acquires captured images captured by the front camera 31, the rear camera 33, the left side camera 35, and the right side camera 37.

Next, in Step S111, the overhead image acquiring unit 133 acquires an overhead image PB of the surroundings of the vehicle 1 by generating the overhead image PB of the surroundings of the vehicle 1 through combining the captured images acquired in Step S109.

Next, in Step S113, the display image generating unit 135 combines the map image PG, the vehicle mark PM that indicates the location of the vehicle 1, the overhead image PB that is placed surrounding the vehicle mark PM, and the surroundings information image PS that is placed surrounding the overhead image PB, to generate the display image PD that is to be displayed on the display panel 61.

Next, in Step S115, the display controlling unit 136 displays, on the display panel 61, the display image PD that was generated by the display image generating unit 135 in Step S113.

Next, in Step S117, the display image generating unit 135 and the display controlling unit 136 execute a "danger indicating process." The "danger indicating process" is a process for generating an image showing the detection results by the danger detecting unit 134 and displaying it on the display panel 61.

Note that the image that shows the detection results of the danger detecting unit 134 includes the boundary line CF, the direction indicator CFE, the danger detected indicator ED, and the collision danger image ARC. The direction indicator CFE includes a first direction indicator CFR and a second direction indicator CFY. The danger detected indicator ED includes the first danger detected indicator ED1 and the second danger detected indicator ED2.

The "danger indicating process" will be explained further in reference to FIG. 12 and FIG. 13.

Next, in Step S119, the vehicle surroundings information displaying system 100 receives an operation by the user on the operating panel 50, and evaluates whether or not to terminate the vehicle surroundings information displaying process.

If the vehicle surroundings information displaying system 100 evaluates that the vehicle surroundings information displaying process is not to be terminated (Step S119: NO), processing returns to Step S101. If the vehicle surroundings information displaying system 100 evaluates that the vehicle surroundings information displaying process is to be terminated (Step S119: YES), processing is then terminated.

Step S105 and Step S107 correspond to an example of the "surroundings information image generating step." Step S101 and Step S103 correspond to an example of the "map image acquiring step." Step S109 and Step S111 correspond to an example of the "overhead image acquiring step." Step S113 corresponds to an example of the "display image generating step."

As explained in reference to FIG. 11, the display image generating unit 135 combines the map image PG, the vehicle mark PM that indicates the location of the vehicle 1, the overhead image PB that is placed surrounding the vehicle mark PM, and the surroundings information image PS that is placed surrounding the overhead image PB, to generate the display image PD that is to be displayed on the display panel 61. Given this, the display controlling unit 136 displays, on the display panel 61, the display image PD that is generated by the display image generating unit 135. Consequently, surroundings information in a broader range than the overhead image PB can be displayed as the display image PD.

The danger indicating process executed by the vehicle surroundings information displaying system 100 will be explained next in reference to FIG. 12 and FIG. 13.

FIG. 12 and FIG. 13 are each flowcharts showing an example of a danger indicating process of the vehicle surroundings information displaying system 100.

First, as depicted in FIG. 12, in Step S201 the danger detecting unit 134 evaluates, based on the point group data from the distance sensor 40, whether or not a moving body MS has been detected.

If the danger detecting unit 134 evaluates that no moving body MS is detected (Step S201: NO), processing advances to Step S203.

In Step S203, the danger detecting unit 134 detects that the danger of a moving body MS contacting the vehicle 1 is low. The display image generating unit 135 displays the boundary line CF a color, such as green, that indicates that the danger of the vehicle 1 contacting the moving body MS is low. The display controlling unit 136 displays, on the display panel 61, the green first boundary line CF1 that has been generated. Processing then returns to Step S119 of FIG. 11.

If the danger detecting unit 134 evaluates that a moving body MS has been detected (Step S201: YES), processing advances to Step S205.

In Step S205, the surroundings information image generating unit 131 evaluates, based on the point group data from the distance sensor 40, whether or not the moving body MS is a pedestrian.

If the surroundings information image generating unit 131 evaluates that the moving body MS is not a pedestrian (Step S205: NO), processing advances to Step S207.

In Step S207, the display image generating unit 135 generates the boundary line CF in grey, for example. The display controlling unit 136 displays, on the display panel 61, the gray second boundary line CF2 that has been generated. Additionally, the danger detecting unit 134 detects that the moving body MS is a vehicle C.

Thereafter, processing advances to Step S219, shown in FIG. 13.

If the surroundings information image generating unit 131 evaluates that the moving body MS is a pedestrian (Step S205: YES), processing advances to Step S209.

In Step S209, the danger detecting unit 134 evaluates whether or not the pedestrian is in the roadway.

If the danger detecting unit 134 evaluates that the pedestrian is not in the roadway (Step S209: NO), processing advances to Step S211.

In Step S211, the danger detecting unit 134 evaluates that the pedestrian is on a sidewalk, and detects that the danger that the pedestrian will contact with the vehicle 1 is low. The display image generating unit 135 displays the boundary line CF in a color, such as green, that indicates that the danger that the vehicle 1 will contact a pedestrian is low. The display controlling unit 136 displays, on the display panel 61, the green first boundary line CF1 that has been generated. Processing then returns to Step S119 of FIG. 11.

If the danger detecting unit 134 evaluates that the pedestrian is on the roadway (Step S209: YES), processing advances to Step S213.

In Step S213, the danger detecting unit 134 evaluates whether or not the pedestrian is in the first region AR1.

If the danger detecting unit 134 evaluates that the pedestrian is not in the first region AR1 (Step S213: NO), processing advances to Step S215.

In Step S215, the danger detecting unit 134 detects that the danger that the pedestrian will contact the vehicle 1 is low. The display image generating unit 135 displays the boundary line CF in a color, such as green, that indicates that the danger that the vehicle 1 will contact a pedestrian is low. The display controlling unit 136 displays, on the display panel 61, the green first boundary line CF1 that has been generated. Processing then returns to Step S119 of FIG. 11.

If the danger detecting unit 134 evaluates that the pedestrian is in the first region AR1 (Step S213: YES), processing advances to Step S217.

In Step S217, the danger detecting unit 134 detects that the danger that the pedestrian will contact the vehicle 1 is high. The display image generating unit 135 displays the boundary line CF in a color, such as red, that indicates that the danger that the vehicle 1 will contact a pedestrian is high. The display controlling unit 136 displays, on the display panel 61, the red third boundary line CF3 that has been generated. Processing then returns to Step S119 of FIG. 11.

If NO in Step S205, then, in Step S207, the detection is that the moving body MS is a vehicle C, and, as shown in FIG. 13, in Step S219 the danger detecting unit 134 evaluates whether or not the travel speed of the vehicle C is a high speed of no less than a first speed (for example, 70 km/h).

If the danger detecting unit 134 evaluates that the travel speed of the vehicle C is a high speed (Step S219: YES), processing advances to Step S231. If the danger detecting unit 134 evaluates that the travel speed of the vehicle C is not a high speed (Step S219: NO), processing advances to Step S221.

Given this, in Step S221 the danger detecting unit 134 evaluates whether or not the travel speed of the vehicle C is a medium speed of no less than a second speed (for example, 30 km/h).

If the danger detecting unit 134 evaluates that the travel speed of the vehicle C not a medium speed (Step S221: NO), processing then returns to Step S219 in FIG. 11. If the danger detecting unit 134 evaluates that the travel speed of the vehicle C is a medium speed (Step S221: YES), processing advances to Step S223.

In Step S223, the display controlling unit 136 evaluates whether or not to terminate the flashing of the danger detected indicator ED corresponding to a medium-speed vehicle C. Here the danger detected indicator ED is the second danger detected indicator ED2 shown in FIG. 3.

If the display controlling unit 136 evaluates that flashing of the danger detected indicator ED is to be terminated (Step S223: YES), processing advances to Step S225.

In Step S225, the danger detecting unit 134 detects the direction in which there is a danger of contacting the vehicle 1. The display image generating unit 135 generates the direction indicator CFE as a yellow arc-shaped image, and locates it on the circumferential boundary line CF. The display controlling unit 136 displays the direction indicator CFE on the display panel 61. The direction indicator CFE corresponds to the second direction indicator CFY shown in FIG. 3. Processing then returns to Step S119 of FIG. 11.

Note that while in Step S219 the danger detecting unit 134 evaluates whether or not the travel speed of the vehicle C is a high speed, there is no limitation thereto. The danger detecting unit 134 may instead, or in addition to, evaluate the travel speed of the vehicle C, and evaluate the danger through whether or not the difference in travel speed of the vehicle C from the travel speed of the vehicle 1 is greater than a control value.

For example, the danger detecting unit 134 may evaluate the danger through whether or not the speed ratio of the travel speed of the vehicle 1 and the travel speed of the vehicle C is above 1:2. Moreover, for example, it may evaluate the danger depending on whether or not the difference between the travel speed of the vehicle 1 and the travel speed of the vehicle C is greater than 60 km/h.

This makes it possible to exclude, from the danger evaluation, a case wherein both the vehicle 1 and the vehicle C are traveling at identical high speeds when traveling in the same direction on a high-speed road, for example. Moreover, when the vehicle 1 and the vehicle C are traveling in the same direction, danger may be detected if they are rapidly approaching each other.

If the display controlling unit 136 evaluates that the flashing of the danger detected indicator ED is not to be terminated (Step S223: NO), processing advances to Step S227.

In Step S227, the danger detecting unit 134 detects the danger of contacting the vehicle 1 as moderate. The display controlling unit 136 determines the color for the danger detected indicator ED to be, for example, yellow. The display controlling unit 136 flashes the danger detected indicator ED at an end portion of the display panel 61 in the direction, in reference to the vehicle 1, wherein there is a danger of contact with the vehicle 1. The danger detected indicator ED corresponds to the second danger detected indicator ED2 shown in FIG. 3.

Next, in Step S229, the danger detecting unit 134 detects the direction wherein there is a danger of contacting the vehicle 1. The display image generating unit 135 generates the direction indicator CFE as a yellow arc-shaped image, and locates it on the circumferential boundary line CF. The display controlling unit 136 displays the direction indicator CFE on the display panel 61. The direction indicator CFY corresponds to the second direction indicator CFE shown in FIG. 3. Processing then advances to S243.

If YES in Step S219, then, in Step S231, the display controlling unit 136 evaluates whether or not to terminate flashing of the danger detected indicator ED. Here the danger detected indicator ED is the first danger detected indicator ED1 shown in FIG. 3.

If the display controlling unit 136 evaluates that flashing of the danger detected indicator ED is to be terminated (Step S231: YES), processing advances to Step S233.

In Step S233, the image generating unit 135 generates the collision danger image ARC, and the display controlling unit 136 displays the collision danger image ARC. The collision danger image ARC is an image showing the direction of travel of the vehicle C, and the ranges wherein there is a danger of a collision. The collision danger image ARC is the collision danger image ARC shown in FIG. 3.

Next, in Step S235, the danger detecting unit 134 detects the direction wherein there is a danger of contacting the vehicle 1. The display image generating unit 135 generates the direction indicator CFE as a red arc-shaped image, and locates it on the circumferential boundary line CF. The display controlling unit 136 displays the direction indicator CFE on the display panel 61. The direction indicator CFE corresponds to the first direction indicator CFR shown in FIG. 3. Processing then returns to Step S119 of FIG. 11.

If NO in Step S231, then, in Step S237, the danger detecting unit 134 detects a high danger of contact with the vehicle 1. The display controlling unit 136 determines the color for the danger detected indicator ED to be, for example, red. The display controlling unit 136 flashes the danger detected indicator ED at an end portion of the display panel 61 in the direction, in reference to the vehicle 1, wherein there is a danger of contact with the vehicle 1.

The danger detected indicator ED corresponds to the first danger detected indicator ED1 shown in FIG. 3.

Next, in Step S239, the image generating unit 135 generates the collision danger image ARC, and the display controlling unit 136 displays the collision danger image ARC.

Next, in Step S241, the danger detecting unit 134 detects the direction wherein there is a danger of contacting the vehicle 1. The display image generating unit 135 generates the direction indicator CFE as a red arc-shaped image, and locates it on the circumferential boundary line CF. The display controlling unit 136 displays the direction indicator CFE on the display panel 61. The direction indicator CFE corresponds to the first direction indicator CFR shown in FIG. 3.

Next, in Step S243, the display controlling unit 136 evaluates whether or not a prescribed time interval (for example, an interval of three seconds) has elapsed since the start of the flashing display of the danger detected indicator ED in Step S227 or Step S237.

If the display controlling unit 136 evaluates that the prescribed interval has not elapsed (Step S243: NO), processing goes into a standby state. If the display controlling unit 136 evaluates that the prescribed interval has elapsed (Step S243: YES), processing advances to Step S245.

In Step S245, the display controlling unit 136 terminates the flashing display of the danger detected indicator ED. Processing then returns to Step S119 of FIG. 11.

As explained in reference to FIG. 12 and FIG. 13, the moving body MS is a vehicle C, and the first danger detected indicator ED1, the collision danger image ARC, and the first direction indicator CFR are displayed upon detection that the travel speed of the vehicle C is a high speed and the danger of contact with the vehicle 1 is high.

Because the first danger detected indicator ED1 is displayed, the user is able to recognize visually that a vehicle C wherein there is a high danger of contact with the vehicle 1 has been detected at the direction indicated by the first danger detected indicator ED1.

Additionally, the collision danger image ARC is displayed, enabling the user to recognize visually the range of the danger of contact with the vehicle C that is traveling at a high speed.

The display of the first direction indicator CFR enables the user to recognize visually the direction wherein there is a high possibility of contact with a vehicle C that is traveling at a high speed.

As explained above, the vehicle surroundings information displaying system 100 according to the present embodiment comprises: a surroundings information image generating unit 131 for generating a surroundings information image PS, showing the surroundings information for the vehicle 1, based on point group data that indicates distances from the vehicle 1, acquired by a distance sensor 40; a map image acquiring unit 132 for acquiring a map image PG of the surroundings of the vehicle 1; an overhead image acquiring unit 133 for acquiring an overhead image PB of the surroundings of the vehicle 1; and a display image generating unit 135 for generating a display image PD, to be displayed on the display panel 61, by combining the map image PG, a vehicle mark PM that indicates the location of the vehicle 1, the overhead image PB that is placed surrounding the vehicle mark PM, and the surroundings information image PS that is placed surrounding the overhead image PB.

A display image PD that combines the map image PG, the vehicle mark PM, the overhead image PB, and the surroundings information image PS is displayed thereby on the display panel 61, enabling a display of surroundings information in a range that is wider than that of the overhead image PB.

Additionally, the first region AR1 wherein the overhead image PB is displayed is a circular region centered on the vehicle mark PM Through this, the overhead image PB that is generated as a rectangular image does not include the end portion regions wherein there is great distortion, enabling a smooth connection with the map image PG. This enables the display image PD to be displayed with good readability.

Moreover, a danger detecting unit 134 for detecting, through point group data, a moving body MS for which there is a danger of contacting the vehicle 1 is provided, where the display image generating unit 135 displays with emphasis the circumferential boundary line CF between the circular first region AR1 and the second region AR2 wherein the surroundings information image PS is displayed, for the direction, in reference to the vehicle 1, wherein there is the danger of the vehicle 1 contacting the moving body MS (for example, a vehicle C).

The user is thus able to recognize easily, through the direction, in reference to the vehicle 1, of the boundary line CF that is displayed with emphasis, the direction wherein there is a danger that the vehicle 1 will contact the moving body MS.

The emphasized display includes displaying the color of the boundary line CF with a color that is different from that of another part of the boundary line CF, for the direction, in reference to the vehicle 1, wherein there is a danger of the vehicle 1 contacting the moving body MS (for example, a vehicle C).

The user is thus able to recognize easily, through the direction, in reference to the vehicle 1, of the boundary line CF that is displayed in a color that is different from that of another part of the boundary line CF, the direction wherein there is a danger that the vehicle 1 will contact the moving body MS. For example, as explained in reference to FIG. 3, the color of the boundary line CF in the direction wherein there is the danger of the vehicle 1 contacting the moving body MS may be displayed in red, and the other parts of the boundary line CF may be displayed in gray. The first direction indicator CFR depicted in FIG. 3 indicates the direction wherein there is a danger that the vehicle 1 will contact the moving body MS.

The emphasized display may be a flashing display of the boundary line CF in the direction, in reference to the vehicle 1, wherein there is a danger.

In this case, the flashing display of the boundary line CF enables the user to recognize easily the direction wherein there is a danger that the vehicle 1 will contact the moving body MS.

Additionally, there may be a connection to enable communication with a server system, and the map image acquiring unit 132 may acquire the map image PG from the server system.

In this case, the map image acquiring unit 132 acquires the map image PG from the server system, enabling the processing in the map image acquiring unit 132 to be simplified.

Additionally, the distance sensor 40 includes a LiDAR (Light Detection And Ranging).

Consequently, the surroundings information image PS that shows the surroundings information is generated based on point group data for indicating distances from the vehicle 1, acquired by LiDAR, making it possible to generate an image showing correct surroundings information as the surroundings information image PS.

Moreover, the vehicle surroundings information displaying method in the present embodiment includes: a surroundings information image generating step for generating a surroundings information image PS showing the surroundings information for the vehicle 1 based on point group data, showing distances from the vehicle 1, acquired by the distance sensor 40; a map image acquiring step for acquiring a map image PG of the surroundings of the vehicle 1; an overhead image acquiring step for acquiring an overhead image PB of the surroundings of the vehicle 1; and a display image generating step for generating a display image PD, to be displayed on the display panel 61, through combining the map image PG, a vehicle mark PM showing the location of the vehicle 1, an overhead image PB placed surrounding the vehicle mark PM, and a surroundings information image PS placed surrounding the overhead image PB.

Through this, a display image PD that combines the map image PG, the vehicle mark PM, the overhead image PB, and the surroundings information image PS is displayed thereby on the display panel 61, enabling a display of surroundings information in a range that is wider than that of the overhead image PB.

The embodiment set forth above is no more than an illustration of one form of the present invention, and the present invention may be modified and applied appropriately in a range that does not deviate from the spirit and intent thereof.

For example, for ease in understanding the present invention, FIG. 1 is a diagram wherein the structural elements are shown partitioned into the main processing details, and the structural elements may be partitioned into more structural elements depending on the processing details. Moreover, the partitioning may be such that more processes are carried out by a single structural element.

Moreover, the processes in any of the structural elements may be executed in a single hardware or executed by a plurality of hardware.

Moreover, the processes of each structural element may be achieved by a single program, or by a plurality of programs.

Moreover, in FIG. 1 the vehicle surroundings information displaying system 100 may be provided integrally with the detecting unit 20 and/or the display unit 50.

Moreover, while in the present embodiment the vehicle surroundings information displaying system 100 was provided with a surroundings information image generating unit 131, a map image acquiring unit 132, an overhead image acquiring unit 133, a danger detecting unit 134, a display image generating unit 135, and a display controlling unit 136, there is no limitation thereto. A server system that is connected with the vehicle surroundings information displaying system 100 so as to enable communications through a network, such as the Internet, may provide the surroundings information image generating unit 131, the map image acquiring unit 132, the overhead image acquiring unit 133, the danger detecting unit 134, the display image generating unit 135, and/or at the display controlling unit 136. The server system may provide, for example, the map image acquiring unit 132 and the overhead image acquiring unit 133. In this case, the overhead image acquiring unit 133 may acquire an overhead image PB that was imaged by an artificial satellite.

Additionally, while in the present embodiment the explanation was for a case wherein the moving body MS was a vehicle C and a case wherein the moving body MS was a pedestrian, there is no limitation thereto. For example, the moving body MS may instead be a bicycle.

Moreover, while in the present embodiment the explanation was for a case wherein the overhead image PB was displayed in a first region AR1 that is a circular region, there is no limitation thereto. The overhead image PB may be displayed in a rectangular region instead.

Moreover, while in the present embodiment the explanation was for a case wherein the end portion of the display panel 61 was flashed at prescribed intervals as the danger detected indicator ED, there is no limitation thereto. The direction indicator CFE may be flashed at prescribed intervals instead as the danger detected display ED. In this case there would be no need for the danger detected indicator ED, simplifying processing.

Moreover, when the vehicle surroundings information displaying method according to the present invention is achieved using a computer, the structure may be in the form of a recording medium whereon a control program to be executed by a computer is recorded, or a transmitting medium for transmitting the control program.

The recording medium may use a magnetic or optical recording medium, or a semiconductor memory device. Specifically, it may be a fixed recording medium or a portable recording medium such as a flexible disk, an HDD, a CD-ROM (Compact Disk Read-Only Memory), a DVD, a Blu-ray® disc, a magnetooptical disc, a flash memory, a card-type recording medium, or the like. Moreover, the recording medium may be a RAM, a ROM, or a non-volatile storage system, such as an HDD, provided by the vehicle surroundings information displaying system 100.

The control program may be downloaded by the vehicle surroundings information displaying system 100 from a server system to which the vehicle surroundings information displaying system 100 is connected so as to be able to communicate through a network.

Moreover, the processing unit in the flowcharts shown in FIG. 11, FIG. 12, and FIG. 13 are partitioned depending on the main processing units to facilitate easy understanding of the processes of the vehicle surroundings information displaying system 100, for example, but the present invention is not limited by the names and ways in which the processing units are divided. The processes of the vehicle surroundings information displaying system 100 may be divided into more processing units depending on the process details. Moreover, the processes of the vehicle surroundings information displaying system 100 may instead be divided so as to include more processes in a single processing unit.

EXPLANATION OF REFERENCE SYMBOLS

100: Vehicle Surroundings Information Displaying System
1: Vehicle
10: Location Detecting Unit
20: Detecting Unit
30: Imaging Unit
40: Distance Sensor (Sensor)
50: Operating Unit
60: Display Unit
61: Display Panel (Display)
130: Processor 131: Surroundings Information Image Generating Unit
132: Map Image Acquiring Unit
133: Overhead Image Acquiring Unit
134: Danger Detecting Unit
135: Image Generating Unit
136: Display Controlling Unit
140: Memory
141: Map Storing Unit
142: Image Storing Unit
AR1: First Region
AR2: Second Region
ARC: Collision Danger Image
C: Vehicle
C1: First Vehicle
C2: Second Vehicle
CF: Boundary Line
CFE: Direction Indicator
CFR: First Direction Indicator
CFY: Second Direction Indicator
ED: Danger Detected Indicator
ED1: First Danger Detected Indicator
ED2: Second Danger Detected Indicator
MS: Moving Body
PM: Vehicle Mark
PD: Display Image
PB: Overhead Image
PG: Map Image
PS: Surroundings Information Image

What is claimed is:

1. A vehicle surroundings information displaying system comprising: a processor that includes:
   a surroundings information image generating unit for generating surroundings information, showing surroundings information for a vehicle, based on point group data that indicate distances from a vehicle, acquired by a sensor;
   a map image acquiring unit for acquiring a map image of the surroundings of the vehicle;
   an overhead image acquiring unit for acquiring an overhead image of the surroundings of the vehicle;
   a display image generating unit for generating a display image, to be displayed on the display panel, through combining the map image, a vehicle mark that indicates the location of the vehicle, an overhead image placed surrounding the vehicle mark, and a surroundings information image placed surrounding the overhead image; and
   a danger detecting unit for detecting, through the point group data, a moving body wherein there is a danger of contacting the vehicle, wherein
   the region wherein the overhead image is displayed is a circular region centered on the vehicle mark, and
   the display image generating unit displays with emphasis a circumferential boundary line between the circular region and a region for displaying the surroundings information image, for the direction, in reference to the vehicle, wherein there is a danger of the vehicle contacting the moving body.

2. A vehicle surroundings information displaying system set forth in claim 1, wherein:
   the emphasized display includes displaying the color of the boundary line in a color other than another part of the boundary line, for the direction, in reference to the vehicle, of the danger.

3. A vehicle surroundings information displaying system set forth in claim 1, wherein:
   the emphasized display includes flashing display of the boundary line for the direction, in reference to the vehicle, of the danger.

4. A vehicle surroundings information displaying system set forth in claim 1:
   able to connect to a server so as to enable communication, wherein:
   the map image acquiring unit acquires a map image from the server system.

5. A vehicle surroundings information displaying system set forth in claim 1:
   the sensor includes a LiDAR (Light Detection And Ranging).

6. A vehicle surroundings information displaying method, including:
   a surroundings information image generating step for generating surroundings information, showing surroundings information for a vehicle, based on point group data that indicate distances from a vehicle, acquired by a sensor;
   a map image acquiring step for acquiring a map image of the surroundings of the vehicle;
   an overhead image acquiring step for acquiring an overhead image of the surroundings of the vehicle;
   a display image generating step for generating a display image, to be displayed on the display panel, through combining the map image, a vehicle mark that indicates the location of the vehicle, an overhead image placed surrounding the vehicle mark, and a surroundings information image placed surrounding the overhead image; and
   a step detecting, through the point group data, a moving body wherein there is a danger of contacting the vehicle, wherein
   the region wherein the overhead image is displayed is a circular region centered on the vehicle mark, and
   the display image generating step displays with emphasis a circumferential boundary line between the circular region and a region for displaying the surroundings information image, for the direction, in reference to the vehicle, wherein there is a danger of the vehicle contacting the moving body.

* * * * *